(12) United States Patent
Lee et al.

(10) Patent No.: US 9,281,759 B2
(45) Date of Patent: Mar. 8, 2016

(54) POWER CONVERTING APPARATUS AND PHOTOVOLTAIC MODULE

(71) Applicant: LG ELECTRONICS INC., Seoul (KR)

(72) Inventors: Kiok Lee, Seoul (KR); Eonjoo Hwang, Seoul (KR); Myonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 494 days.

(21) Appl. No.: 13/749,870

(22) Filed: Jan. 25, 2013

(65) Prior Publication Data

US 2013/0193775 A1    Aug. 1, 2013

(30) Foreign Application Priority Data

Jan. 27, 2012 (KR) .................. 10-2012-0008250
Jul. 16, 2012 (KR) .................. 10-2012-0077005
Jul. 16, 2012 (KR) .................. 10-2012-0077006

(51) Int. Cl.
| | |
|---|---|
| H02J 5/00 | (2006.01) |
| H02M 7/537 | (2006.01) |
| H02M 3/156 | (2006.01) |
| H02M 3/158 | (2006.01) |
| H02M 7/5387 | (2007.01) |
| H02M 3/335 | (2006.01) |
| H02J 3/38 | (2006.01) |
| H02M 1/00 | (2007.01) |

(52) U.S. Cl.
CPC .............. *H02M 7/537* (2013.01); *H02J 3/385* (2013.01); *H02J 5/00* (2013.01); *H02M 3/156* (2013.01); *H02M 3/1582* (2013.01); *H02M 3/1584* (2013.01); *H02M 3/3353* (2013.01); *H02M 7/53871* (2013.01); *H02M 2001/007* (2013.01); *H02M 2003/1586* (2013.01); *Y02E 10/58* (2013.01)

(58) Field of Classification Search
CPC ........... H02J 5/00; H02J 3/385; H02M 7/537; H02M 3/156
See application file for complete search history.

(56) References Cited

U.S. PATENT DOCUMENTS

| | | | | |
|---|---|---|---|---|
| 5,460,244 | A * | 10/1995 | Tanahashi | 187/293 |
| 7,929,325 | B2 * | 4/2011 | De Rooij et al. | 363/71 |
| 8,264,100 | B2 * | 9/2012 | Rozman et al. | 307/73 |

(Continued)

FOREIGN PATENT DOCUMENTS

| | | |
|---|---|---|
| CN | 102332841 A | 1/2012 |
| JP | 10-23673 A | 1/1998 |

(Continued)

*Primary Examiner* — Thienvu Tran
*Assistant Examiner* — Pinping Sun
(74) *Attorney, Agent, or Firm* — Birch, Stewart, Kolasch & Birch, LLP

(57) ABSTRACT

A power converting apparatus and a photovoltaic module are discussed. The power converting apparatus includes a converter including a tapped inductor and a first switch, the converter converting a level of an input direct current (DC) voltage and outputting the level-converted DC voltage, and an inverter including a plurality of switches, the inverter converting the level-converted DC voltage into an alternating current (AC) voltage. The inverter operates separately in a first switching mode where the inverter performs a switching operation at a first frequency for a first period of the converted AC voltage and a second switching mode where the inverter performs a switching operation at a second frequency for a second period of the converted AC voltage, the second frequency being lower than the first frequency.

21 Claims, 23 Drawing Sheets

(56) References Cited

U.S. PATENT DOCUMENTS

| | | | |
|---|---|---|---|
| 2004/0223351 A1* | 11/2004 | Kurokami et al. | 363/65 |
| 2009/0086520 A1* | 4/2009 | Nishimura | 363/133 |
| 2009/0296434 A1 | 12/2009 | De Rooij et al. | |
| 2011/0031816 A1* | 2/2011 | Buthker et al. | 307/82 |
| 2011/0241433 A1* | 10/2011 | Sihler et al. | 307/82 |
| 2012/0140533 A1* | 6/2012 | Li | 363/37 |
| 2012/0206894 A1* | 8/2012 | Huang et al. | 361/807 |

FOREIGN PATENT DOCUMENTS

| | | | | |
|---|---|---|---|---|
| JP | 2000-152647 A | | 5/2000 | |
| JP | 2000152647 A | * | 5/2000 | H02M 7/48 |

* cited by examiner

POWER CONVERTING APPARATUS AND PHOTOVOLTAIC MODULE

CROSS-REFERENCE TO RELATED APPLICATIONS

This application claims priority to and the benefit of Korean Patent Application Nos. 10-2012-0008250, filed on Jan. 27, 2012, 10-2012-0077005, filed on Jul. 16, 2012, and 10-2012-0077006, filed on Jul. 16, 2012, in the Korean Intellectual Property Office, the disclosure of each of which is incorporated herein by reference.

BACKGROUND OF THE INVENTION

1. Field of the Invention

The invention relates to a power converting apparatus and a photovoltaic module, and more particularly to a power converting apparatus and a photovoltaic module which are capable of improving quality of an output current.

2. Description of the Related Art

Recently, as existing energy resources such as petroleum and coal are depleted, interest in alternative energy resources is increasing. A solar cell among such alternative energy sources has been highlighted as a next-generation cell which directly converts solar energy into electrical energy using a semiconductor device.

On the other hand, a photovoltaic module is defined by a series or parallel connection of solar cells for solar photovoltaic power generation. The photovoltaic module may include a junction box for gathering electricity generated by the solar cells.

SUMMARY OF THE INVENTION

It is an object of the invention to provide a power converting apparatus and a photovoltaic module which are capable of improving quality of an output current.

In accordance with an aspect of the invention, the above and other objects can be accomplished by the provision of a power converting apparatus including a converter including a tapped inductor and a first switch, the converter converting a level of an input direct current (DC) voltage and outputting the level-converted DC voltage, and an inverter including a plurality of switches, the inverter converting the level-converted DC voltage into an alternating current (AC) voltage, wherein the inverter operates separately in a first switching mode where the inverter performs a switching operation at a first frequency for a first period of the converted AC voltage and a second switching mode where the inverter performs a switching operation at a second frequency for a second period of the converted AC voltage, the second frequency being lower than the first frequency.

In accordance with another aspect of the invention, there is provided a photovoltaic module including a solar cell module including a plurality of solar cells, and a power converting unit to convert direct current (DC) power supplied from the solar cell module into alternating current (AC) power, wherein the power converting unit includes a converter including a tapped inductor and a first switch, the converter converting a level of an input DC voltage and outputting the level-converted DC voltage, and an inverter including a plurality of switches, the inverter converting the level-converted DC voltage into an AC voltage, wherein the inverter operates separately in a first switching mode where the inverter performs a switching operation at a first frequency for a first period of the converted AC voltage and a second switching mode where the inverter performs a switching operation at a second frequency for a second period of the converted AC voltage, the second frequency being lower than the first frequency.

In accordance with another aspect of the invention, there is provided a power converting apparatus including a switching unit including a switch, the switching unit switching an input direct current (DC) voltage to selectively output the DC voltage, a converter including a tapped inductor and a switch, the converter converting a level of the DC voltage from the switching unit and outputting the level-converted DC voltage, and an inverter including a plurality of switches, the inverter converting the level-converted DC voltage into an alternating current (AC) voltage, wherein the converter operates in a first power conversion mode for a turn-off period of the switch of the switching unit and in a second power conversion mode for a turn-on period of the switch of the switching unit.

In accordance with a further aspect of the invention, there is provided a photovoltaic module including a solar cell module including a plurality of solar cells, and a power converting unit to convert direct current (DC) power supplied from the solar cell module into alternating current (AC) power, wherein the power converting unit includes a switching unit including a switch, the switching unit switching an input DC voltage to selectively output the DC voltage, a converter including a tapped inductor and a switch, the converter converting a level of the DC voltage from the switching unit and outputting the level-converted DC voltage, and an inverter including a plurality of switches, the inverter converting the level-converted DC voltage into an AC voltage, wherein the converter operates in a first power conversion mode for a turn-off period of the switch of the switching unit and in a second power conversion mode for a turn-on period of the switch of the switching unit.

BRIEF DESCRIPTION OF THE DRAWINGS

The above and other objects, features and other advantages of the invention will be more clearly understood from the following detailed description taken in conjunction with the accompanying drawings, in which.

DETAILED DESCRIPTION OF THE EMBODIMENTS

Reference will now be made in detail to the example embodiments of the invention, examples of which are illustrated in the accompanying drawings. Wherever possible, the same reference numbers will be used throughout the drawings to refer to the same or like parts.

It should be noted that the suffixes of constituent elements used in the following description, such as "module" and "unit", are simply used by considering the ease of writing this specification and do not have any particular importance or role. Accordingly, the terms "module" and "unit" may be used interchangeably.

Figure 1:
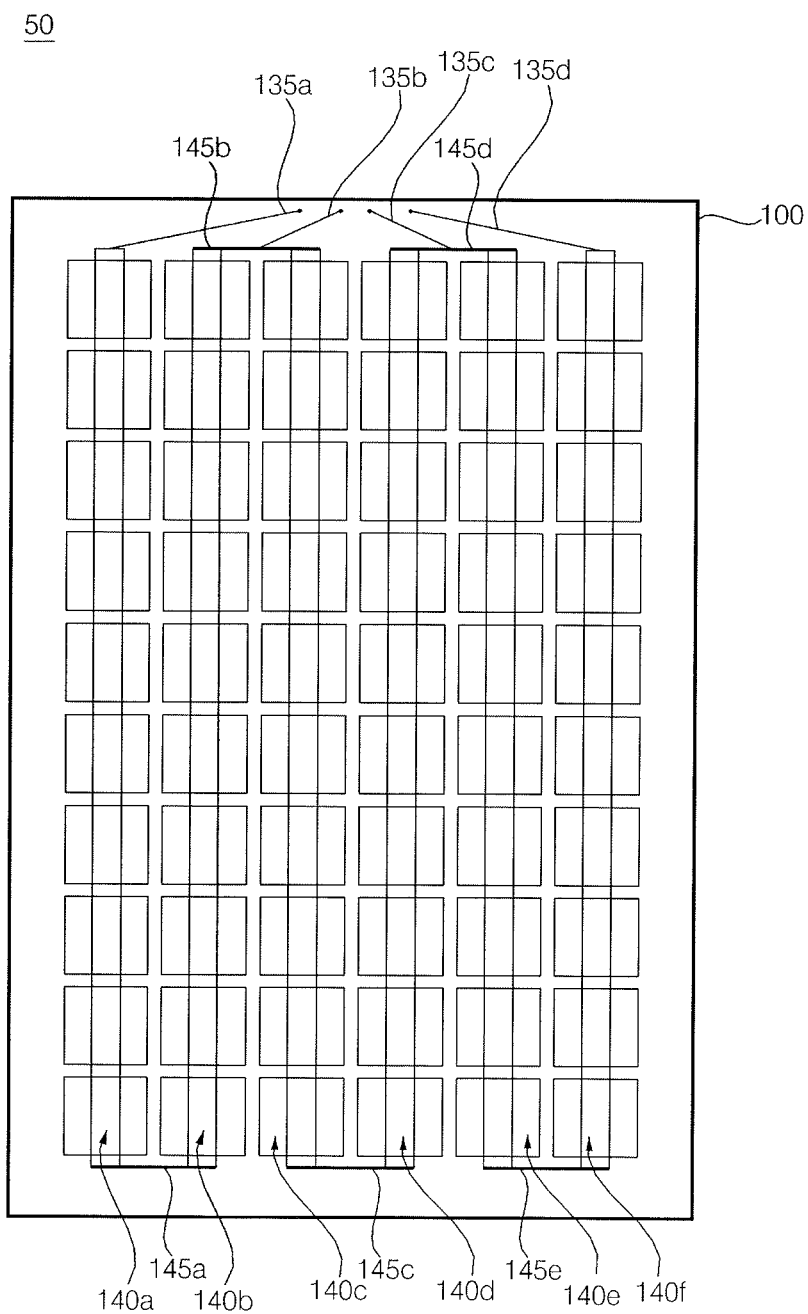
FIG. 1 is a front view of a photovoltaic module according to an embodiment of the invention.
Figure 2:
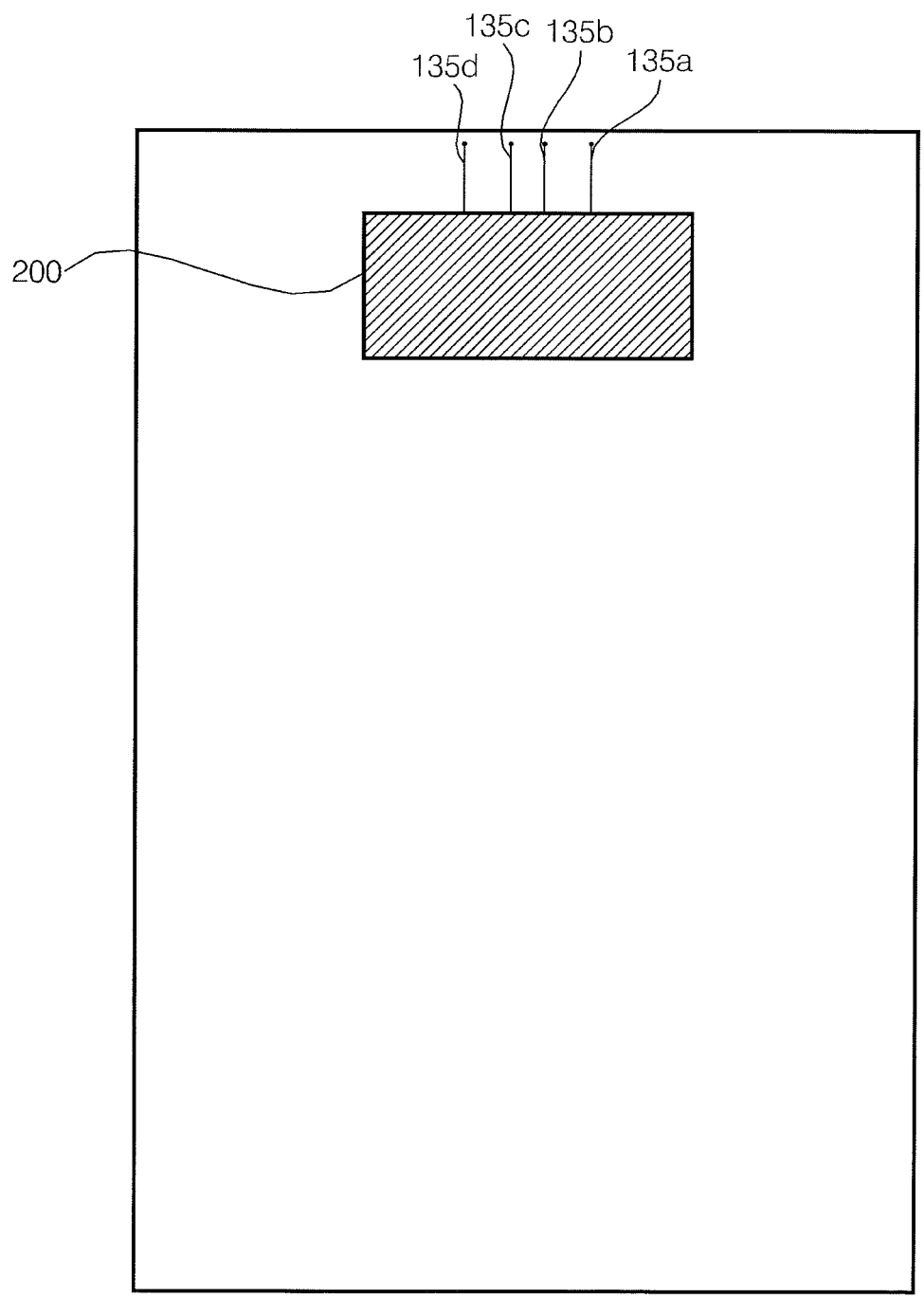
FIG. 2 is a rear view of the photovoltaic module of FIG. 1.
Figure 3:
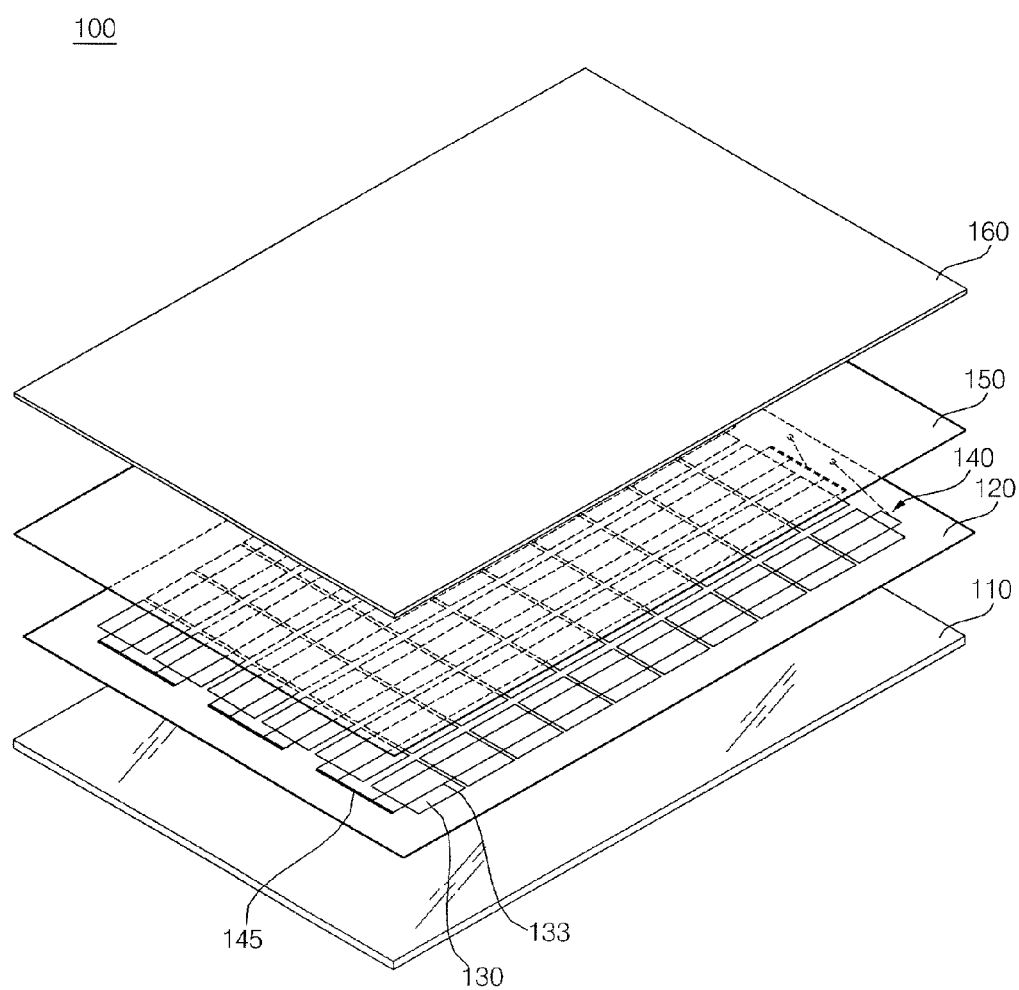
FIG. 3 is an exploded perspective view of a solar cell module in FIG. 1.

FIG. 1 is a front view of a photovoltaic module according to an embodiment of the invention, FIG. 2 is a rear view of the photovoltaic module of FIG. 1, and FIG. 3 is an exploded perspective view of a solar cell module in FIG. 1.

Referring to FIGS. 1 to 3, the photovoltaic module according to embodiments of the invention, denoted by reference numeral 50, includes a solar cell module 100, and a junction box 200 disposed at one side of the solar cell module 100. Also, the photovoltaic module 50 may further include a heat dissipation member disposed between the solar cell module 100 and the junction box 200.

The solar cell module 100 may include a plurality of solar cells 130. Also, the solar cell module 100 may further include a first sealing member 120 disposed on the bottom of the solar cells 130, a second sealing member 150 disposed on the top of the solar cells 130, a rear substrate 110 disposed on the lower surface of the first sealing member 120, and a front substrate 160 disposed on the upper surface of the second sealing member 150.

Each solar cell 130 is a semiconductor device which converts solar energy into electrical energy, and may be a silicon solar cell, a compound semiconductor solar cell, a tandem solar cell, a fuel sensitive solar cell, a CdTe solar cell or a CIGS solar cell.

Each solar cell 130 is formed of a light receiving surface on which sunlight is incident, and a back surface which is opposite to the light receiving surface. For example, each solar cell 130 may include a silicon substrate of a first conductive type, a semiconductor layer formed on the silicon substrate and having a second conductive type which is opposite to the first conductive type, an antireflection film formed on the semiconductor layer of the second conductive type and having at least one opening for exposing a portion of the surface of the semiconductor layer of the second conductive type, a front electrode coming into contact with the surface portion of the semiconductor layer of the second conductive type exposed through the at least one opening, and a rear electrode formed on the rear surface of the silicon substrate.

The solar cells 130 may be electrically connected in series, in parallel or in series-parallel. In detail, the solar cells 130 may be electrically connected by ribbons 133. Each ribbon 133 may be joined to the front electrode formed on the light receiving surface of any one of the solar cells 130 and the rear electrode formed on the back surface of another one of the solar cells 130 adjacent to the one solar cell.

FIGS. 1 and 3 illustrate that each of the ribbons 133 is defined by two lines and the solar cells 130 are connected in columns by the ribbons 133 to constitute solar cell strings 140. That is, it is illustrated that there are formed six solar cell strings 140a, 140b, 140c, 140d, 140e and 140f, each of which includes ten solar cells. A variety of modifications may be provided differently from the drawings such that any number of the solar cell strings and any number of the solar cells may be used to construct the solar cell module 100.

On the other hand, the solar cell strings may be electrically connected by bus ribbons. FIG. 1 illustrates that the first solar cell string 140a and second solar cell string 140b, the third solar cell string 140c and fourth solar cell string 140d, and the fifth solar cell string 140e and sixth solar cell string 140f are electrically connected respectively by bus ribbons 145a, 145c and 145e disposed at the bottom of the solar cell module 100. Also, FIG. 1 illustrates that the second solar cell string 140b and third solar cell string 140c, and the fourth solar cell string 140d and fifth solar cell string 140e are electrically connected respectively by bus ribbons 145b and 145d disposed at the top of the solar cell module 100.

On the other hand, the ribbon 133 constituting the first solar cell string 140a, the bus ribbons 145b and 145d, and the ribbon 133 constituting the sixth solar cell string 140f are electrically connected respectively to first to fourth conductive lines 135a, 135b, 135c and 135d, which are connected with bypass diodes Da, Db and Dc in the junction box 200 disposed on the rear surface of the solar cell module 100. FIGS. 1 and 2 illustrate that the first to fourth conductive lines 135a, 135b, 135c and 135d extend to the rear surface of the solar cell module 100 through openings formed in the solar cell module 100.

On the other hand, it is preferable, but not required, that the junction box 200 be disposed adjacent to one of both ends of the solar cell module 100 to which the conductive lines 135a, 135b, 135c and 135d extend.

FIGS. 1 and 2 illustrate that the junction box 200 is disposed at the top of the rear surface of the solar cell module 100 because the first to fourth conductive lines 135a, 135b, 135c and 135d extend from the top of the solar cell module 100 to the rear surface of the solar cell module 100. Therefore, each conductive line can be reduced in length, so that a power loss can be reduced.

On the other hand, the first to fourth conductive lines 135a, 135b, 135c and 135d may extend from the bottom of the solar cell module 100 to the rear surface of the solar cell module 100 differently from FIGS. 1 and 2. In this instance, the junction box 200 may be disposed at the bottom of the rear surface of the solar cell module 100.

The rear substrate 110 is a back sheet which has waterproofing, insulation and ultraviolet interception functions, and may be, but is not limited to, of a Tedlar/PET/Tedlar (TPT) type. Also, although the rear substrate 110 is shown in FIG. 3 as having a rectangular shape, it may be manufactured in various shapes including a circle and a semicircle according to an environment in which the solar cell module 100 is installed or to be installed.

On the other hand, the first sealing member 120 may be attached to the rear substrate 110 and formed of the same size as that of the rear substrate 110. The solar cells 130 may be arranged on the first sealing member 120 in such a manner that they are positioned adjacent to each other to form a plurality of columns.

The second sealing member 150 may be disposed on the solar cells 130 and joined with the first sealing member 120 by lamination.

Here, the first sealing member 120 and the second sealing member 150 enable respective elements of the solar cells to be chemically coupled. Each of the first sealing member 120 and second sealing member 150 may be, but is not limited to, an Ethylene Vinyl Acetate (EVA) film.

On the other hand, the front substrate 160 may be disposed on the second sealing member 150 to transmit sunlight therethrough. Preferably, but not necessarily, the front substrate 160 is a tempered glass to protect the solar cells 130 from external shock, etc. More preferably, but not necessarily, the front substrate 160 is a low-iron tempered glass to prevent a reflection of sunlight and increase transmittance of sunlight.

The junction box 200 may be attached to the rear surface of the solar cell module 100, and perform power conversion using a direct current (DC) voltage supplied from the solar cell module 100. In detail, the junction box 200 may include a capacitor unit (520 in FIG. 7) for storing a DC voltage. Also, the junction box 200 may further include a converter (530 in FIG. 7) for converting the level of a DC voltage and outputting the level-converted DC voltage. Also, the junction box 200 may further include the bypass diodes Da, Db and Dc, which prevent current between the solar cell strings from flowing backward. Also, the junction box 200 may further include an inverter (540 in FIG. 7) for converting a DC voltage into an alternating current (AC) voltage. This configuration will be described later in detail with reference to FIG. 7.

Figure 7:
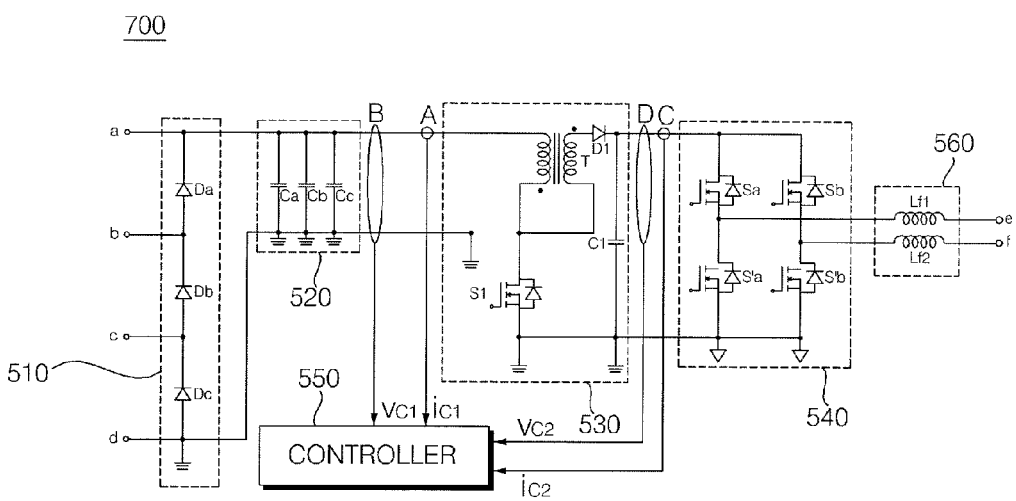
FIG. 7 is a circuit diagram showing an example of an internal configuration of a power converting apparatus according to one embodiment of the invention.

In this manner, the junction box 200 according to the embodiment of the invention may include at least the bypass diodes Da, Db and Dc, the capacitor unit (520 in FIG. 7), and the converter (530 in FIG. 7).

Provided that the junction box 200 is formed integrally with the solar cell module 100, it is possible to minimize loss of DC power generated by the solar cell module 100 so as to efficiently manage the DC power, as in a photovoltaic system of FIG. 27 or 28 which will be described later. The integrally formed junction box 200 may be referred to as a Module Integrated Converter (MIC) circuit.

On the other hand, coating for water infiltration prevention may be carried out within the junction box 200 using silicon, etc., to prevent water from reaching circuit elements in the junction box 200.

Openings may be formed in the junction box 200 such that the above-stated first to fourth conductive lines 135a, 135b, 135c and 135d are connected with the bypass diodes Da, Db and Dc in the junction box 200 therethrough.

On the other hand, heat may be generated from the bypass diodes Da, Db and Dc, etc., during operation of the junction box 200, thereby reducing efficiency of specific ones of the solar cells 130 arranged at a position at which the junction box 200 is attached.

To prevent this, the photovoltaic module 50 according to the embodiment of the invention may further include a heat dissipation member disposed between the solar cell module 100 and the junction box 200. In order to dissipate heat generated from the junction box 200, it is preferable, but not required, that the heat dissipation member be larger in sectional area than a plate. For example, the heat dissipation member may be formed on the whole of the rear surface of the solar cell module 100. Preferably, but not necessarily, the heat dissipation member is formed of a metallic material with good heat conductivity, such as gold (Au), silver (Ag), copper (Cu), aluminum (Al) or tungsten (W). Other materials may be used.

On the other hand, an external connection terminal which externally outputs a power-converted DC voltage or AC voltage may be formed at one side of the junction box 200.

Figure 4:
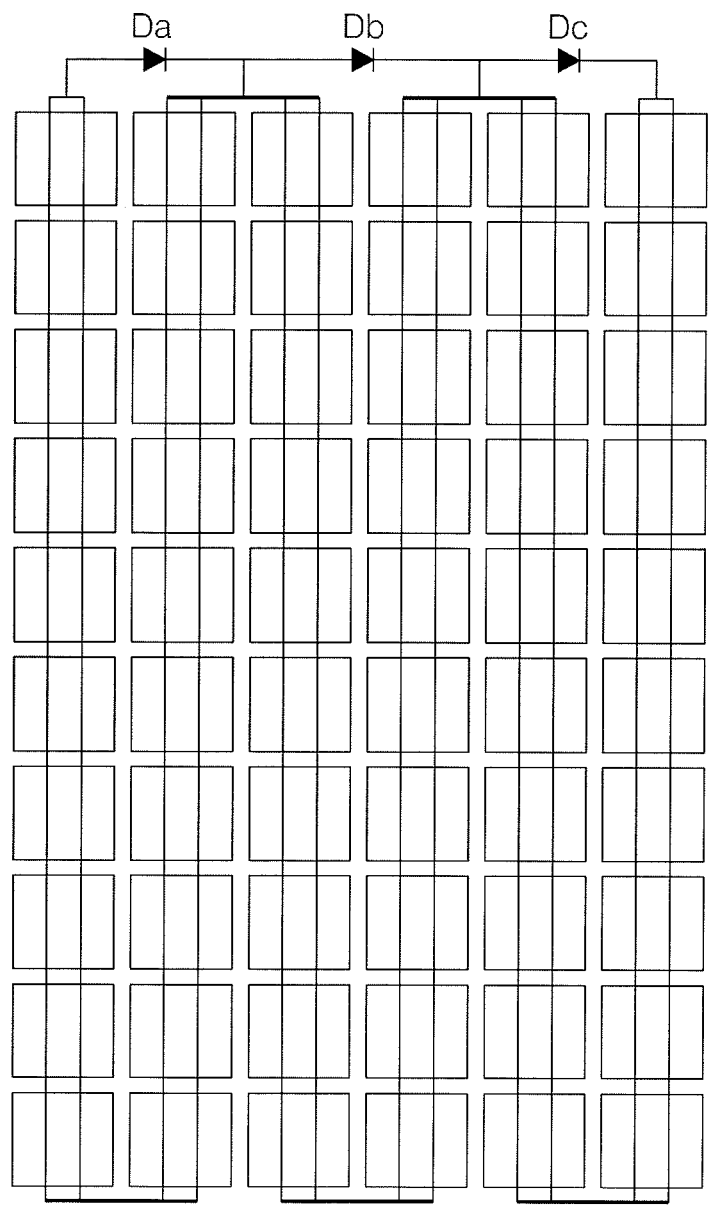
FIG. 4 is a view showing an example of an arrangement of bypass diodes in the photovoltaic module of FIG. 1.

FIG. 4 shows an example of an arrangement of the bypass diodes Da, Db and Dc in the photovoltaic module 50 of FIG. 1.

Referring to FIG. 4, the bypass diodes Da, Db and Dc may be connected correspondingly to the six solar cell strings 140a, 140b, 140c, 140d, 140e and 140f. In detail, the first bypass diode Da is connected between the first solar cell string 140a and the second bus ribbon 145b to bypass the first solar cell string 140a and the second solar cell string 140b when a backward voltage is generated in the first solar cell string 140a or second solar cell string 140b.

For example, a voltage of about 0.6V is generated from a normal solar cell. In this instance, the potential of the cathode of the first bypass diode Da is higher by about 12V (=0.6V×20) than the potential of the anode of the first bypass diode Da. That is, the first bypass diode Da performs a normal operation, not a bypass operation.

On the other hand, in the instance where a hot spot occurs at any one solar cell of the first solar cell string 140a due to shading of the solar cell or attachment of a foreign substance to the solar cell, a backward voltage (about −15V), not the voltage of about 0.6V, is generated from the solar cell. In this instance, the potential of the anode of the first bypass diode Da is higher by about 15V than the potential of the cathode of the first bypass diode Da. Accordingly, the first bypass diode Da performs the bypass operation. As a result, voltages generated from solar cells of the first solar cell string 140a and second solar cell string 140b are not supplied to the junction box 200. In this manner, when some solar cells generate backward voltages, they are bypassed, so that they can be prevented from being damaged. Also, it is possible to supply DC voltages generated from areas other than a hot spot area.

The second bypass diode Db is connected between the second bus ribbon 145b and the fourth bus ribbon 145d to bypass the third solar cell string 140c and the fourth solar cell string 140d when a backward voltage is generated in the third solar cell string 140c or fourth solar cell string 140d.

The third bypass diode Dc is connected between the fourth bus ribbon 145d and the sixth solar cell string 140f to bypass the fifth solar cell string 140e and the sixth solar cell string 140f when a backward voltage is generated in the fifth solar cell string 140e or sixth solar cell string 140f.

Alternatively, six bypass diodes may be connected correspondingly to the six solar cell strings differently from FIG. 4. Of course, other modifications may be provided.

Figure 5:
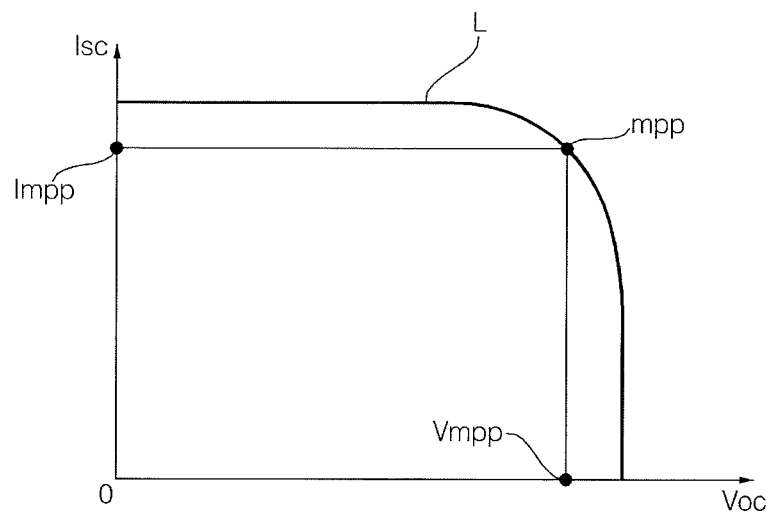
FIG. 5 is a view illustrating a voltage to current curve of the photovoltaic module of FIG. 1.
Figure 6:
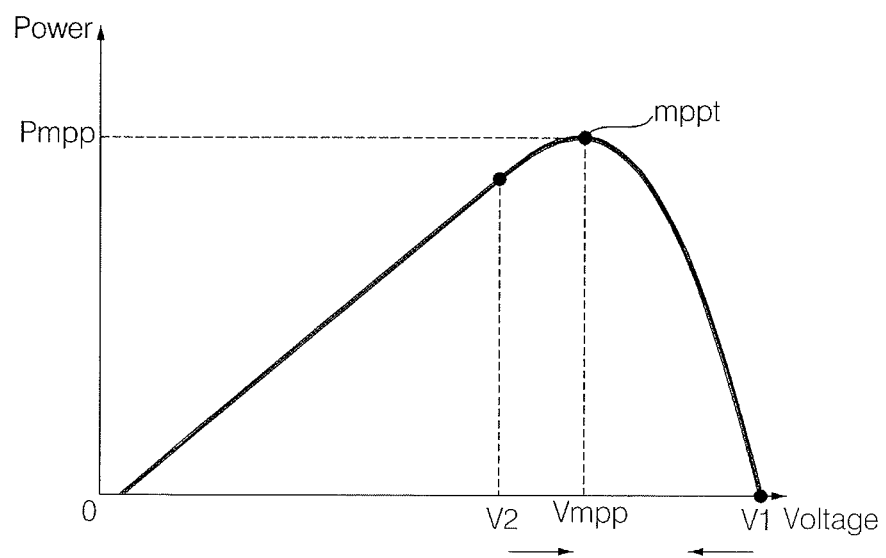
FIG. 6 is a view illustrating a voltage to power curve of the photovoltaic module of FIG. 1.

FIG. 5 illustrates a voltage to current curve of the photovoltaic module 50 of FIG. 1, and FIG. 6 illustrates a voltage to power curve of the photovoltaic module 50 of FIG. 1.

Referring to FIG. 5, when an open-circuit voltage Voc supplied from the solar cell module 100 rises, short current supplied from the solar cell module 100 decreases. According to this voltage-current curve L, the voltage Voc is stored in the capacitor unit 520 provided in the junction box 200.

Referring to FIG. 6, maximum power Pmpp supplied from the solar cell module 100 may be obtained by Maximum Power Point Tracking (MPPT) which is a maximum power detection algorithm. For example, power is calculated with respect to respective voltages while the open-circuit voltage Voc is decreased from a peak voltage V1, and a determination is made as to whether the calculated power is the maximum power Pmpp. Because power is increased from the voltage V1 to a voltage Vmpp, the calculated power is updated and stored. Also, because power is decreased from the voltage Vmpp to a voltage V2, power corresponding to the voltage Vmpp is ultimately determined to be the maximum power Pmpp.

In this manner, when a hot spot does not occur, only one inflection point is generated in the voltage-power curve, so that the maximum power can be simply obtained by merely exploring the section between V1 and V2.

Figure 8:
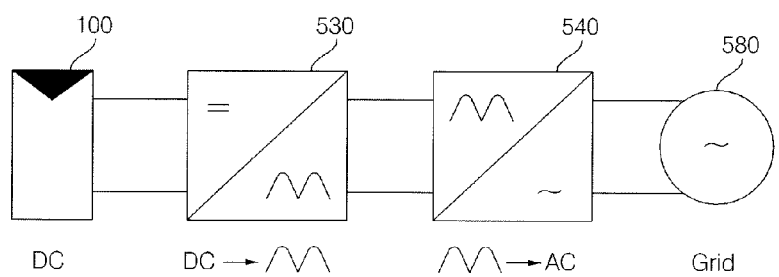
FIG. 8 is a schematic block diagram of the power converting apparatus of FIG. 7.
Figure 9A:
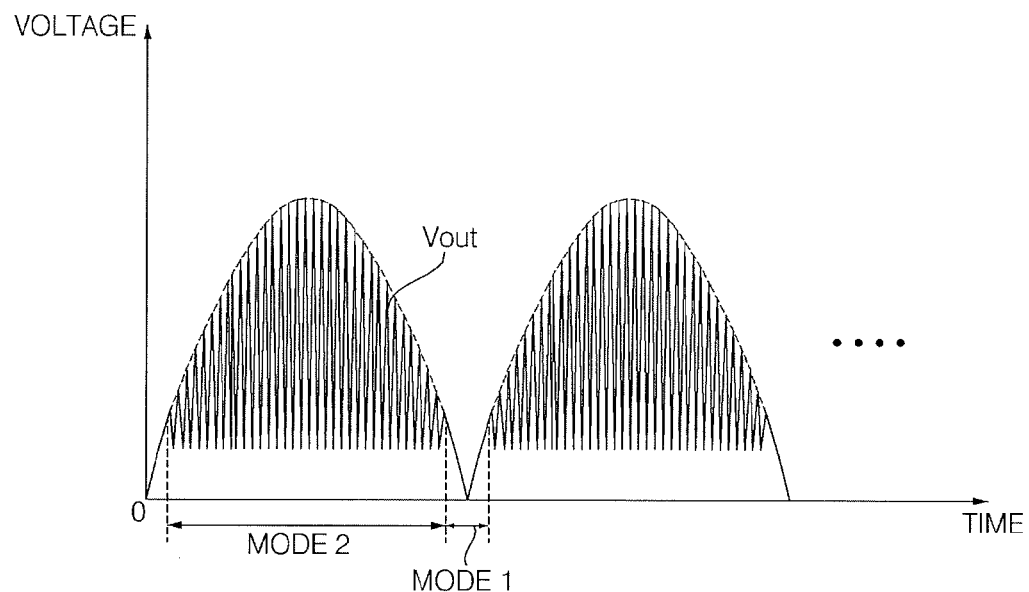
FIGS. 9A and 9B are views illustrating an example and a comparative example of an output current from the power converting apparatus of FIG. 7, respectively.
Figure 9B:
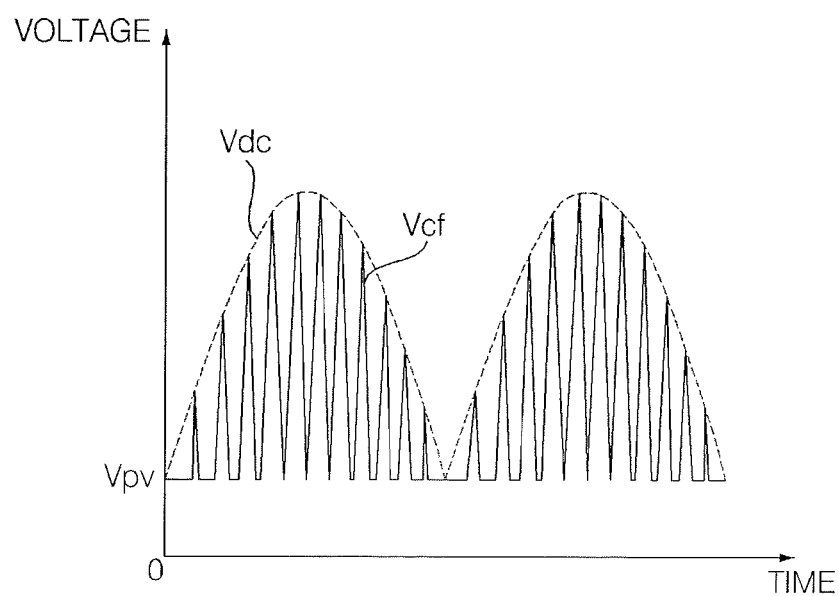
Figure 10A:
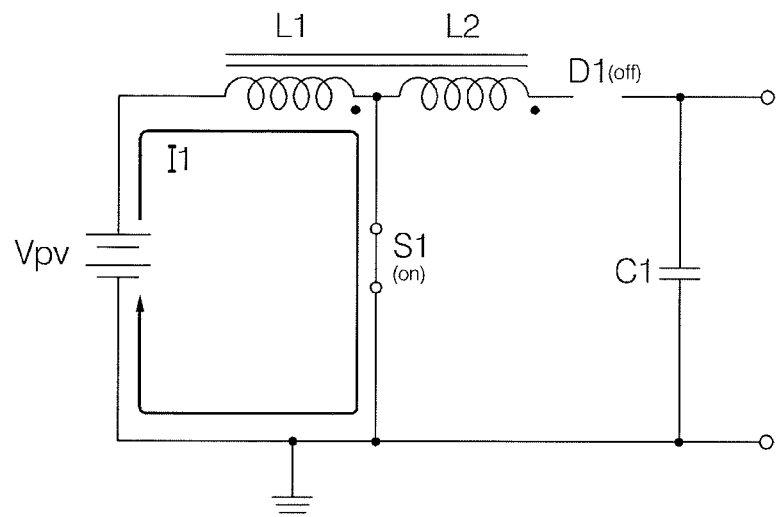
FIGS. 10A and 10B are views referred to for description of the operation of a converter in the power converting apparatus of FIG. 7.
Figure 10B:
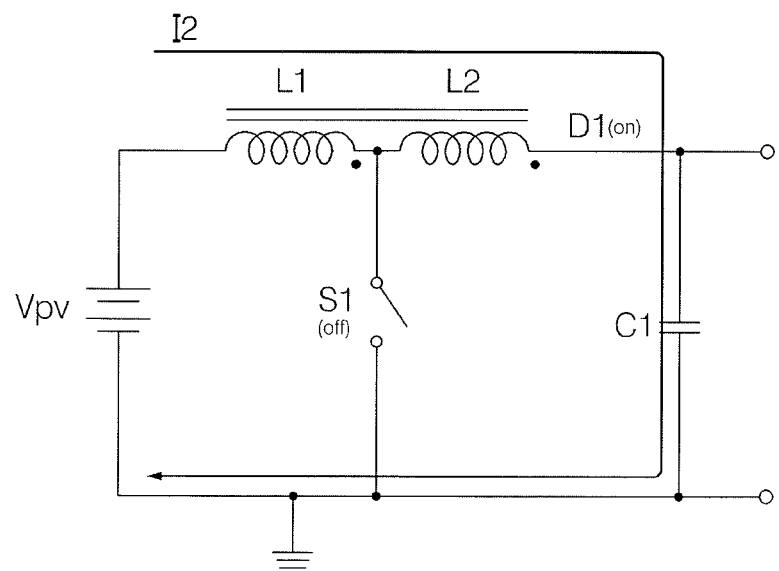

FIG. 7 is a circuit diagram showing an example of an internal configuration of a power converting apparatus according to one embodiment of the invention, FIG. 8 is a schematic block diagram of the power converting apparatus of FIG. 7, FIGS. 9A and 9B are views illustrating an example and a comparative example of an output current from the power converting apparatus of FIG. 7, respectively, FIGS. 10A and 10B are views referred to for description of the operation of a converter in the power converting apparatus of FIG. 7, and FIGS. 11 to 13 are views referred to for description of the operation of the power converting apparatus of FIG. 7.

Referring to FIG. 7, the power converting apparatus according to the embodiment of the invention, denoted by reference numeral 700, may include a bypass diode unit 510, the capacitor unit 520, the converter 530, the inverter 540, a controller 550, and a filter 560.

The power converting apparatus 700 receives DC power, converts the received DC power into AC power and outputs the converted AC power. In particular, the power converting apparatus 700 according to the embodiment of the invention receives DC power generated by the solar cell module 100, converts the received DC power into AC power and outputs the converted AC power.

Because the power converting apparatus 700 is capable of outputting AC power, it may be referred to as a micro inverter. On the other hand, the power converting apparatus 700 may be installed in the junction box 200 in FIG. 2, as stated previously. That is, the power converting apparatus 700 may be attached to the rear surface of the solar cell module 100 integrally therewith.

The bypass diode unit 510 includes the first to third bypass diodes Da, Db and Dc, which are disposed respectively between a node a and a node b, between the node b and a node c and between the node c and a node d. The nodes a, b, c and d correspond to the first to fourth conductive lines 135a, 135b, 135c and 135d, respectively.

The capacitor unit 520 stores a DC voltage supplied from the solar cell module 100. To this end, the capacitor unit 520 includes three capacitors Ca, Cb and Cc. Although the three capacitors Ca, Cb and Cc are illustrated in FIG. 7 as being connected in parallel, they may be connected in series or in series-parallel combination. Also, the capacitors may be changed in number.

The converter 530 performs level conversion using the DC voltage stored in the capacitor unit 520. In the embodiment of the invention, the converter 530 is illustrated as a tapped inductor boost converter to boost the DC voltage supplied from the solar cell module 100 to up the level thereof, and output the level-upped DC voltage. The tapped inductor boost converter can output a low voltage as a high voltage of high efficiency in comparison with a boost converter or a flyback converter.

In particular, provided that the solar cell module 100 includes about 50 to 60 solar cells to output a DC voltage of about 30 to 50V, the use of the tapped inductor boost converter enables efficient output of a high voltage (about 300V or more).

To this end, the converter 530 includes a tapped inductor T, a first switch S1 connected between the tapped inductor T and a ground terminal, and a diode D1 connected to an output terminal of the tapped inductor T for performing one-way conduction. The converter 530 may further include a capacitor C1 connected between an output terminal of the diode D1, namely, a cathode and the ground terminal for storing an output voltage.

In detail, the first switch S1 is connected between a tap of the tapped inductor T and the ground terminal. The output terminal (secondary side) of the tapped inductor T is connected to an anode of the diode D1, and the capacitor C1 is connected between the cathode of the diode D1 and the ground terminal.

On the other hand, the primary side and secondary side of the tapped inductor T have opposite polarities. The tapped inductor T may be referred to as a switching transformer.

The inverter 540 converts the level-converted DC voltage from the converter 530 into an AC voltage. In FIG. 7, the inverter 540 is illustrated as a full-bridge inverter. That is, an upper-arm switch Sa or Sb and a lower-arm switch S'a or S'b connected in series are paired, and a total of two pairs of upper-arm and lower-arm switches Sa&S'a and Sb&S'b are connected in parallel. Also, a diode is connected to each of the switches Sa, S'a, Sb and S'b in inverse parallel.

Each switch in the inverter 540 is turned on/off based on an inverter control signal from the controller 550. As a result, an AC voltage having a certain frequency is output from the inverter 540. Preferably, but not necessarily, the output AC voltage has the same AC frequency (about 60 Hz or 50 Hz) as that of a grid.

The filter 560 performs low pass filtering to smooth the AC voltage output from the inverter 540. To this end, the filter 560 is illustrated in FIG. 7 as including inductors Lf1 and Lf2, but is not limited thereto.

An input current detector A detects input current ic1 to the converter 530, and an input voltage detector B detects an input voltage vc1 to the converter 530. The detected input current ic1 and input voltage vc1 may be input to the controller 550.

On the other hand, an output current detector C detects an output current ic2 from the converter 530, and an output voltage detector D detects an output voltage vc2 from the converter 530. The detected output current ic2 and output voltage vc2 may be input to the controller 550.

The controller 550 may output a control signal to control the first switch S1 in the converter 530 in FIG. 7. In particular, the controller 550 may output a turn-on timing signal for the first switch S1 in the converter 530 based on at least one of the detected input current ic1, input voltage vc1, output current ic2 and output voltage vc2.

Also, the controller 550 may output the inverter control signal to control each of the switches Sa, S'a, Sb and S'b in the inverter 540. In particular, the controller 550 may output a turn-on timing signal for each of the switches Sa, S'a, Sb and S'b in the inverter 540 based on at least one of the detected input current ic1, input voltage vc1, output current ic2 and output voltage vc2.

Also, the controller 550 may calculate a maximum power point of the solar cell module 100, and control the converter 530 to output a DC voltage corresponding to the calculated maximum power point.

On the other hand, referring to FIG. 8, the converter 530 of the power converting apparatus 700 according to the embodiment of the invention may convert the DC voltage from the solar cell module 100 into a pseudo DC voltage.

As the on/off switching of the first switch S1 is controlled, the converter 530 may output a pseudo DC voltage having the same envelope as that of a half-wave rectified DC voltage, not a DC voltage having a constant level. As a result, the pseudo DC voltage may be stored in the capacitor C1.

The inverter 540 receives the pseudo DC voltage, and performs a switching operation for the received pseudo DC voltage to output an AC voltage.

On the other hand, in the instance where the tapped inductor boost converter 530 in FIG. 7 is used to output the pseudo DC voltage, the pseudo DC voltage, denoted by Vcf, has the same envelope Vdc as that of a half-wave rectified DC voltage and an offset based on an input voltage Vpv, as shown in FIG. 9B. That is, a constant-voltage period corresponding to the input voltage Vpv is generated for a determined period. For this reason, a desired output AC voltage waveform may not be obtained, and the quality of an output current may be deteriorated. In particular, the influence of a harmonic current component may be increased.

To prevent this, in the embodiment of the invention, operation modes are classified according to the constant-voltage period of the DC voltage output from the converter 530 and the other period thereof, and the converter 530 and the inverter 540 operate corresponding to the respective operation modes.

Particularly, the controller 550 determines whether the DC voltage vc2 detected by the output voltage detector D has a constant level and, when the detected DC voltage vc2 has the constant level, controls the converter 530 and the inverter 540 such that they operate in a first switching mode. However, when the detected DC voltage vc2 does not have the constant level, the controller 550 controls the converter 530 and the inverter 540 such that they operate in a second switching mode.

In the instance where the converter 530 and the inverter 540 operate under the condition that the operation modes thereof are classified into the first switching mode and the second switching mode, it is possible to obtain an output AC voltage waveform which does not have any offset, as shown in FIG. 9A. That is, a desired output AC voltage waveform can be obtained, and the quality of the output current can be improved. In particular, the influence of a harmonic current component can be reduced.

Hereinafter, operations in the first switching mode and second switching mode will be described with reference to FIGS. 10A to 13.

FIGS. 10A and 10B are views referred to for description of the operation of the tapped inductor boost converter 530.

A brief description will be given of the operation of the converter 530. When the first switch S1 is turned on, a closed loop is formed through the input voltage Vpv, the primary side of the tapped inductor T and the first switch S1 and first current I1 flows along the closed loop, as shown in FIG. 10A. At this time, the diode D1 does not conduct, namely, it is turned off, because the secondary side of the tapped inductor T has an opposite polarity to that of the primary side thereof. As a result, energy based on the input voltage Vpv is stored at the primary side of the tapped inductor T.

Next, when the first switch S1 is turned off, a closed loop is formed through the input voltage Vpv, the primary side and secondary side of the tapped inductor T, the diode D1 and the capacitor C1 and second current I2 flows along the closed loop, as shown in FIG. 10B. That is, because the secondary side of the tapped inductor T has an opposite polarity to that of the primary side thereof, the diode D1 conducts. As a result, energy stored at the primary side and secondary side of the tapped inductor T is stored in the capacitor C1 via the diode D1.

In this manner, the converter 530 can output a DC voltage of high efficiency and high level using the input voltage Vpv and the energy stored at the primary side and secondary side of the tapped inductor T.

Figure 11:
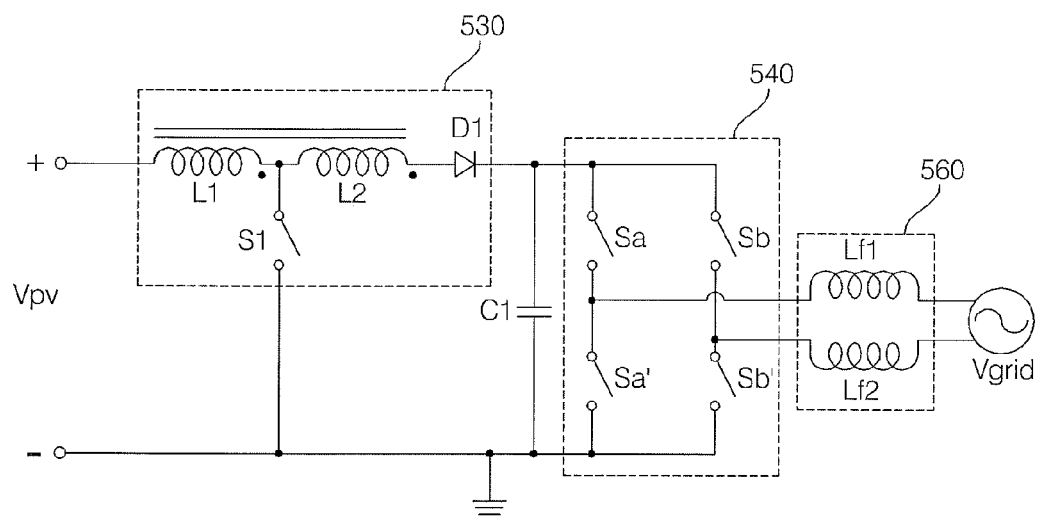
FIGS. 11 to 13 are views referred to for description of the operation of the power converting apparatus of FIG. 7.
Figure 12:
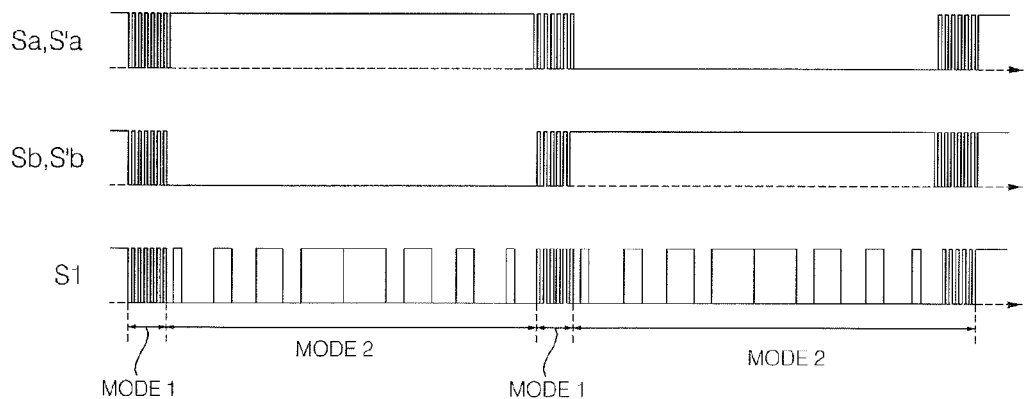
Figure 13:
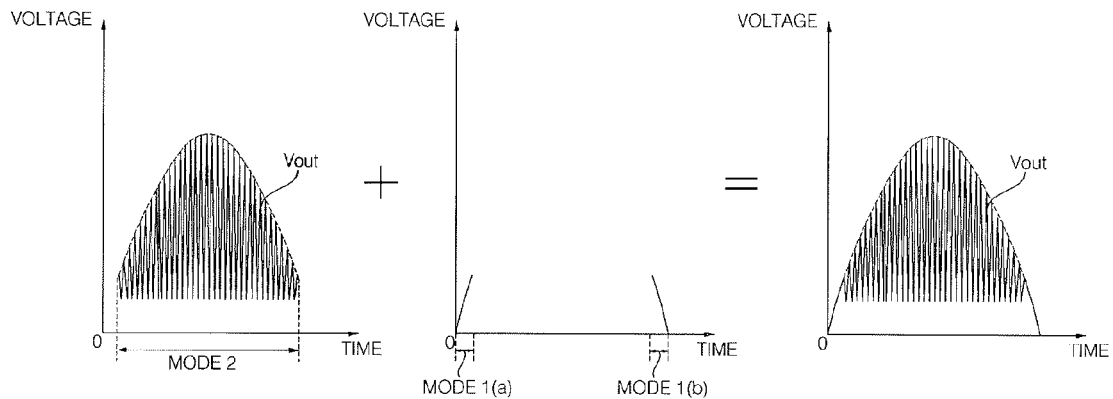

FIG. 11 is a schematic circuit diagram of the power converting apparatus of FIG. 7, FIG. 12 is a waveform diagram of the switches in the converter 530 and inverter 540, and FIG. 13 is a waveform diagram of an AC voltage finally output through the first switching mode and the second switching mode.

When the constant-voltage period corresponding to the input voltage Vpv is generated in the pseudo DC voltage output from the converter 530, the controller 550 may control the switches Sa, S'a, Sb and S'b in the inverter 540 such that each of the switches Sa, S'a, Sb and S'b performs a high-speed switching operation in the first switching mode, denoted by MODE 1, as shown in FIG. 12. For example, each of the switches Sa, S'a, Sb and S'b may perform the switching operation at a high frequency of 100 kHz.

Also, the controller 550 may control the first switch S1 in the converter 530 such that the first switch S1 also performs a high-speed switching operation in a period of the first switching mode MODE 1. In particular, the controller 550 may control the high-speed switching operation of the first switch S1 such that it corresponds to a switching frequency of each of the switches Sa, S'a, Sb and S'b in the inverter 540.

As a result, the DC voltage falls to a ground voltage of 0V in the constant-voltage period, as shown in FIG. 9A. Therefore, the quality of the output current from the inverter 540 can be improved. Also, a harmonic current component can be significantly reduced.

On the other hand, in the other period of the DC voltage output from the converter 530 other than the constant-voltage period, the controller 550 may control the switches Sa, S'a, Sb and S'b in the inverter 540 such that each of the switches Sa, S'a, Sb and S'b performs a low-speed switching operation in the second switching mode, denoted by MODE 2, as shown in FIG. 12. For example, each of the switches Sa, S'a, Sb and S'b may perform the switching operation at a low frequency of 120 Hz.

Also, the controller 550 may control the first switch S1 in the converter 530 such that the first switch S1 also performs a low-speed switching operation in a period of the second switching mode MODE 2. In particular, the first switch S1 may perform a pulse width modulation (PWM)-based switching operation such that the converter 530 outputs the pseudo DC voltage.

Finally, an output voltage Vout as shown in FIG. 9A may be provided from the power converting apparatus 700 by synthesis of output voltage waveforms in the first switching modes MODE 1(a) and MODE 1(b) and an output voltage waveform in the second switching mode MODE 2, as shown in FIG. 13.

On the other hand, the output AC voltage waveform as shown in FIG. 9A or 13 is low-pass filtered by the filter 560 in FIG. 11, so as to be output as a smoothed AC voltage waveform.

Figure 14:
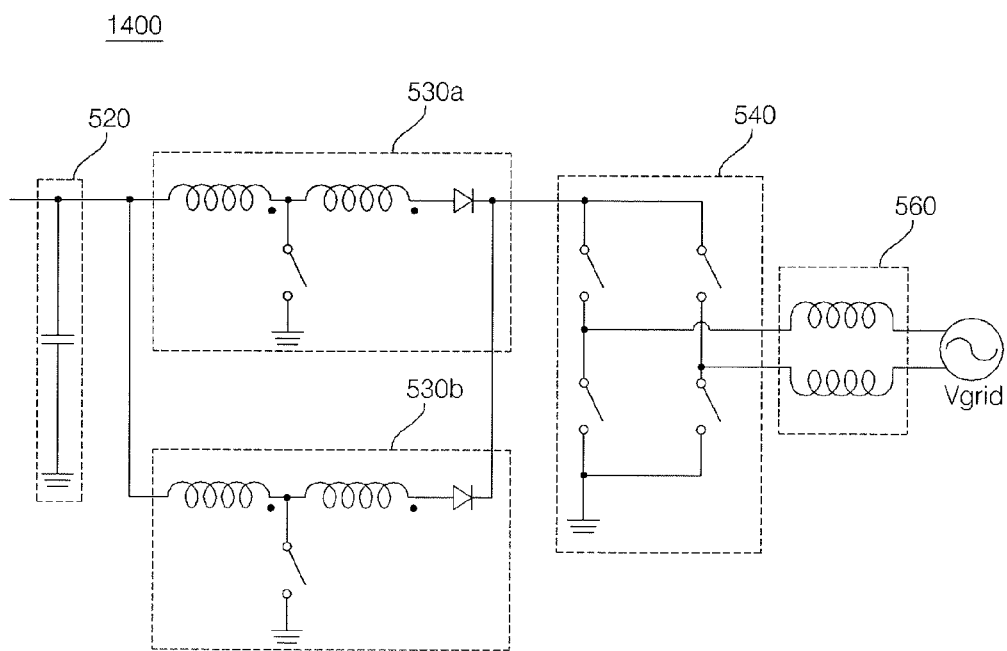
FIG. 14 is a circuit diagram showing another example of the internal configuration of the power converting apparatus according to the one embodiment of the invention.

On the other hand, the configuration of FIG. 14 is substantially the same as that of FIG. 7, with the exception that two tapped inductor boost converters 530a and 530b are used.

That is, the power converting apparatus of FIG. 14, denoted by reference numeral 1400, may include the capacitor unit 520, the two tapped inductor boost converters 530a and 530b, the inverter 540, and the filter 560.

In the instance where the two tapped inductor boost converters 530a and 530b are connected in parallel, namely, they are interleaved, as shown in FIG. 14, a current component delivered through the capacitor unit 520 is branched in parallel, so that a ripple of a current component output through each of the converters 530a and 530b is reduced. Therefore, it is possible to secure reliability of the capacitors in the capacitor unit 520.

Figure 15:
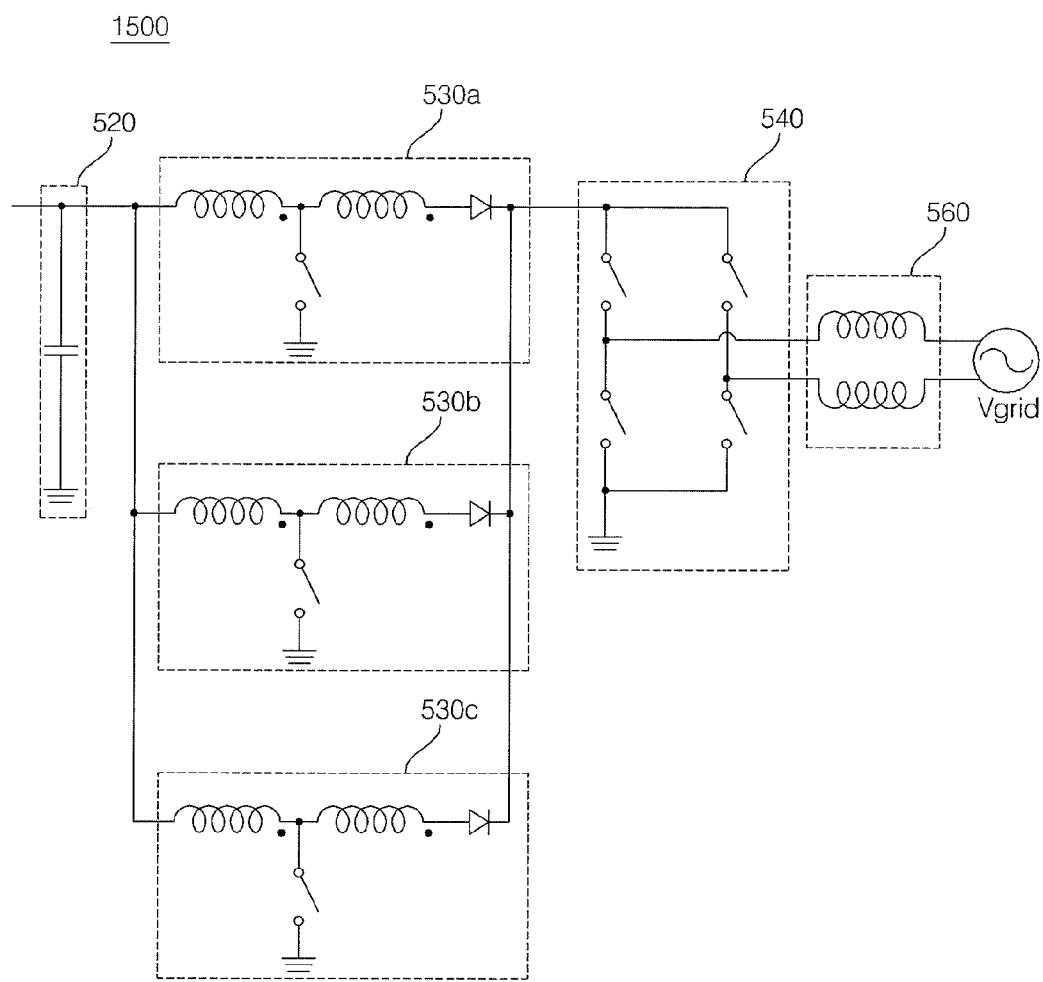
FIG. 15 is a circuit diagram showing another example of the internal configuration of the power converting apparatus according to the one embodiment of the invention.

On the other hand, the configuration of FIG. 15 is substantially the same as that of FIG. 7, with the exception that three tapped inductor boost converters 530a, 530b and 530c are used.

That is, the power converting apparatus of FIG. 15, denoted by reference numeral 1500, may include the capacitor unit 520, the three tapped inductor boost converters 530a, 530b and 530c, the inverter 540, and the filter 560.

Here, tapped inductors in the respective converters 530a, 530b and 530c may have the same characteristics and switches in the respective converters 530a, 530b and 530c may also have the same characteristics.

In the instance where the three tapped inductor boost converters 530a, 530b and 530c are connected in parallel, namely, they are interleaved, as shown in FIG. 15, a current component delivered through the capacitor unit 520 is branched in parallel, so that a ripple of a current component output through each of the converters 530a, 530b and 530c is reduced. Therefore, it is possible to secure reliability of the capacitors in the capacitor unit 520.

On the other hand, the converters 530a, 530b and 530c may operate adaptively to a power requirement for an output AC voltage.

For example, only the first converter 530a may operate when the power requirement is about 100 W, only the first and second converters 530a and 530b may operate when the power requirement is about 200 W, and all the first to third converters 530a, 530b and 530c may operate when the power requirement is about 300 W.

On the other hand, when at least two of the first to third converters 530a, 530b and 530c operate, the switches therein may have the same turn-on/off timing.

Figure 16:
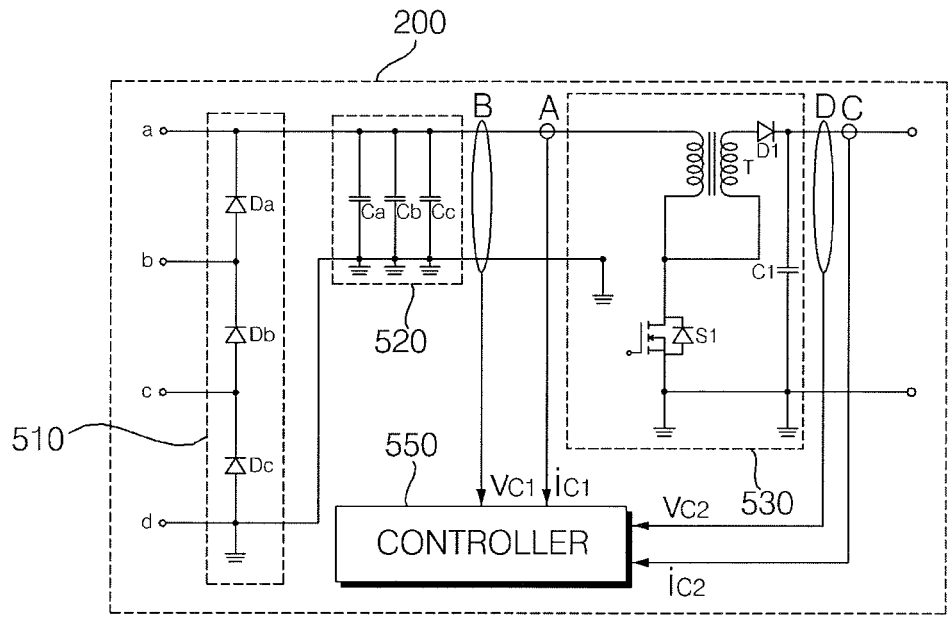
FIG. 16 is a circuit diagram showing an example of an internal configuration of a junction box in the photovoltaic module of FIG. 1.

FIG. 16 is a circuit diagram showing an example of an internal configuration of the junction box 200 in the photovoltaic module 50 of FIG. 1.

Referring to FIG. 16, the junction box 200 according to the embodiment of the invention may include the bypass diode unit 510, the capacitor unit 520, the converter 530, and the controller 550. That is, the junction box 200 according to the embodiment of the invention is characterized in that it does not include the inverter 540 and filter 560 in the power converting apparatus 700 of FIG. 7. The inverter 540 and filter 560, not included in the junction box 200, may be provided separately.

With this configuration, the junction box 200 of FIG. 16 may output a DC voltage. Provided that the junction box 200 performs a power optimizing function, it may be referred to as a power optimizer.

By including, in the junction box, the capacitor unit which stores a DC voltage and the converter which converts the level of the stored DC voltage and outputs the level-converted DC voltage, as shown in FIG. 16, it is possible to supply a DC voltage simply through the junction box. Also, this junction box facilitates installation of the photovoltaic module, and is advantageous to capacity extension in configuring a photovoltaic system including a plurality of photovoltaic modules.

On the other hand, the junction box 200 may include only the bypass diode unit 510 and capacitor unit 520 differently from FIGS. 7 and 16. In this instance, the converter 530, the inverter 540 and the filter 560 may be disposed separately outside of the junction box 200.

Figure 17:
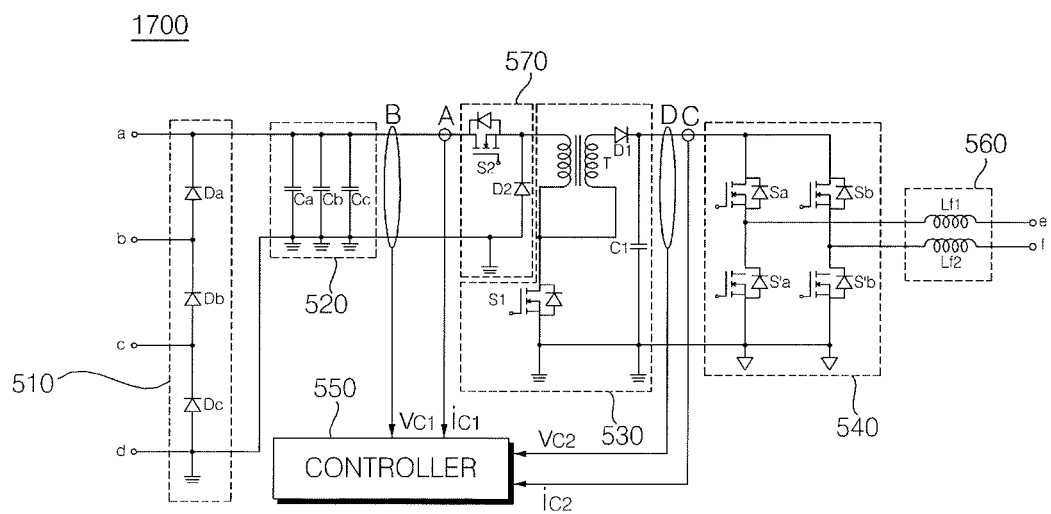
FIG. 17 is a circuit diagram showing an example of an internal configuration of a power converting apparatus according to another embodiment of the invention.
Figure 18:
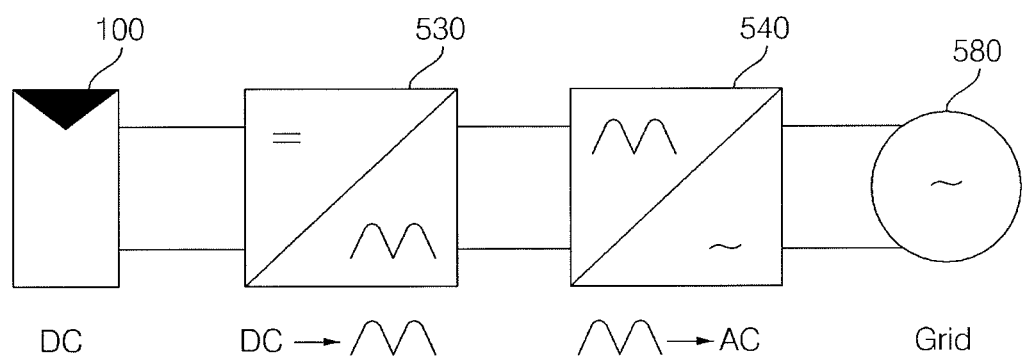
FIG. 18 is a schematic block diagram of the power converting apparatus of FIG. 17.
Figure 19A:
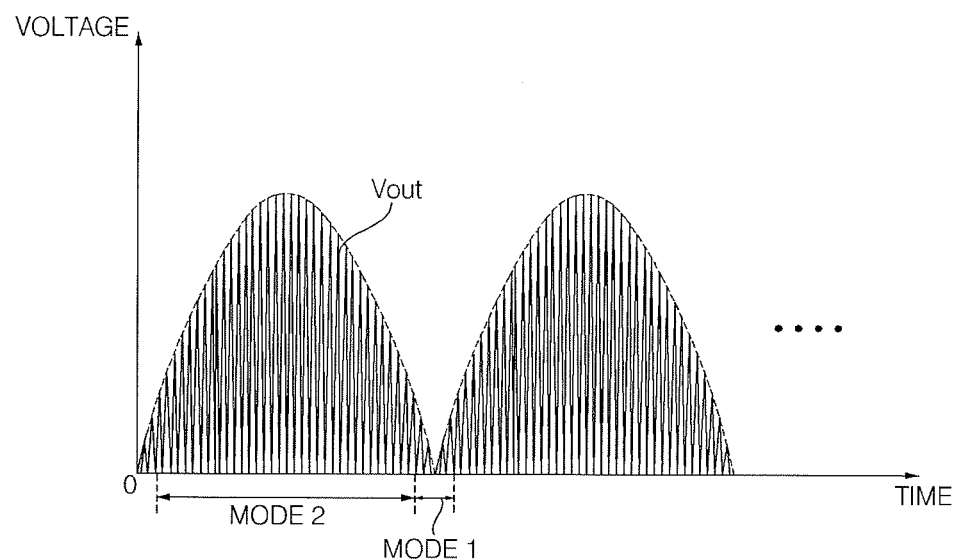
FIGS. 19A and 19B are views illustrating an example and a comparative example of an output current from the power converting apparatus of FIG. 17, respectively.
Figure 19B:
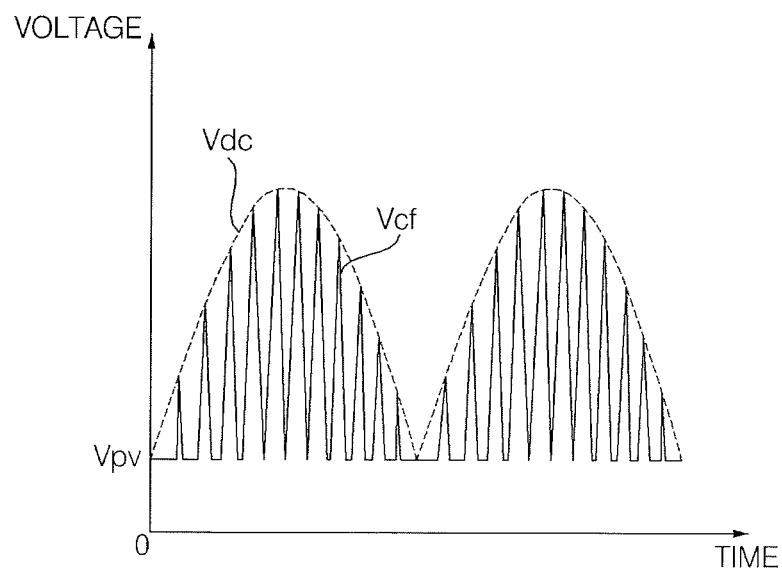

FIG. 17 is a circuit diagram showing an example of an internal configuration of a power converting apparatus according to another embodiment of the invention, FIG. 18 is a schematic block diagram of the power converting apparatus of FIG. 17, FIGS. 19A and 19B are views illustrating an example and a comparative example of an output current from the power converting apparatus of FIG. 17, respectively, FIGS. 20A to 20D are views referred to for description of the operations of a switching unit and a converter in the power converting apparatus of FIG. 17, and FIGS. 21 to 23 are views referred to for description of the operation of the power converting apparatus of FIG. 17.

Referring to FIG. 17, the power converting apparatus according to the embodiment of the invention, denoted by reference numeral 1700, may include a bypass diode unit 510, the capacitor unit 520, the converter 530, the inverter 540, a controller 550, a filter 560, and a switching unit 570.

The power converting apparatus 1700 of FIG. 17 is substantially the same in configuration as the power converting apparatus 700 of FIG. 7, with the exception that it further includes the switching unit 570. Hereinafter, a description will be given centered on such a difference in configuration.

The switching unit 570 switches a DC voltage stored in the capacitor unit 520 to selectively output the DC voltage. To this end, the switching unit 570 may include a second switch S2 and a diode D2. When the second switch S2 is turned on, the DC voltage stored in the capacitor unit 520 is delivered to the converter 530. However, when the second switch S2 is not turned on, the DC voltage stored in the capacitor unit 520 is not delivered to the converter 530.

The converter 530 operates in a boost mode or buck mode based on the above operation of the switching unit 570, as will be described later in detail.

The converter 530 performs level conversion using the DC voltage supplied from the switching unit 570. In the embodiment of the invention, the converter 530 is illustrated as a tapped inductor boost converter to boost the DC voltage supplied from the solar cell module 100 to up the level thereof, and output the level-upped DC voltage. The tapped inductor boost converter can output a low voltage as a high voltage of high efficiency in comparison with a boost converter or flyback converter.

In particular, provided that the solar cell module 100 includes about 50 to 60 solar cells to output a DC voltage of about 30 to 50V, the use of the tapped inductor boost converter enables efficient output of a high voltage (about 300V or more).

The inverter 540 converts the level-converted DC voltage from the converter 530 into an AC voltage. Each switch in the inverter 540 is turned on/off based on an inverter control signal from the controller 550. As a result, an AC voltage having a certain frequency is output from the inverter 540. Preferably, but not necessarily, the output AC voltage has the same AC frequency (about 60 Hz or 50 Hz) as that of a grid.

The filter 560 performs low pass filtering to smooth the AC voltage output from the inverter 540. To this end, the filter 560 is illustrated in FIG. 17 as including inductors Lf1 and Lf2, but is not limited thereto.

An input current detector A detects input current ic1 to the converter 530, and an input voltage detector B detects an input voltage vc1 to the converter 530. The detected input current ic1 and input voltage vc1 may be input to the controller 550.

On the other hand, an output current detector C detects an output current ic2 from the converter 530, and an output voltage detector D detects an output voltage vc2 from the converter 530. The detected output current ic2 and output voltage vc2 may be input to the controller 550.

The controller 550 may output a control signal to control a first switch S1 in the converter 530 in FIG. 17. In particular, the controller 550 may output a turn-on timing signal for the second switch S2 in the switching unit 570 based on at least one of the detected input current ic1, input voltage vc1, output current ic2 and output voltage vc2.

Also, the controller 550 may output the inverter control signal to control each of switches Sa, S'a, Sb and S'b in the inverter 540. In particular, the controller 550 may output a turn-on timing signal for each of the switches Sa, S'a, Sb and S'b in the inverter 540 based on at least one of the detected input current ic1, input voltage vc1, output current ic2 and output voltage vc2.

Also, the controller 550 may calculate a maximum power point of the solar cell module 100, and control the converter 530 to output a DC voltage corresponding to the calculated maximum power point.

On the other hand, referring to FIG. 18, the converter 530 of the power converting apparatus 1700 according to the embodiment of the invention may convert the DC voltage from the solar cell module 100 into a pseudo DC voltage.

As the on/off switching of the first switch S1 is controlled, the converter 530 may output a pseudo DC voltage having the same envelope as that of a half-wave rectified DC voltage, not a DC voltage having a constant level. As a result, the pseudo DC voltage may be stored in the capacitor C1.

The inverter 540 receives the pseudo DC voltage, and performs a switching operation for the received pseudo DC voltage to output an AC voltage.

On the other hand, in the instance where the tapped inductor boost converter 530 in FIG. 17 is used without the switching unit 570 in FIG. 17 to output the pseudo DC voltage, the pseudo DC voltage, denoted by Vcf, has the same envelope Vdc as that of a half-wave rectified DC voltage and an offset based on an input voltage Vpv, as shown in FIG. 19B. That is, a constant-voltage period corresponding to the input voltage Vpv is generated. For this reason, a desired output AC voltage waveform may not be obtained, and the quality of the output current may be deteriorated. In particular, the influence of a harmonic current component may be increased.

To prevent this, in the embodiment of the invention, operation modes MODE 1 and MODE 2 are classified according to the constant-voltage period of the DC voltage output from the converter 530 and the other period thereof, and the switching unit 570 operates corresponding to the respective operation modes.

Particularly, the controller 550 determines whether the DC voltage vc2 detected by the output voltage detector D has a constant level and, when the detected DC voltage vc2 has the constant level, controls the switching unit 570 such that it operates in the first power conversion mode MODE 1. However, when the detected DC voltage vc2 does not have the constant level, the controller 550 controls the switching unit 570 such that it operates in the second power conversion mode MODE 2.

In the instance where the converter 530 and the inverter 540 operate under the condition that the operation modes thereof are classified into the first power conversion mode MODE 1 and the second power conversion mode MODE 2, it is possible to obtain an output AC voltage waveform which falls to a ground voltage, as shown in FIG. 19A. That is, a desired output AC voltage waveform can be obtained, and the quality of the output current can be improved. In particular, the influence of a harmonic current component can be reduced.

Hereinafter, operations in the first power conversion mode MODE 1 and second power conversion mode MODE 2 will be described with reference to FIGS. 20A to 23.

FIGS. 20A to 20D are views referred to for description of the operations of the switching unit 570 and tapped inductor boost converter 530.

Figure 20A:
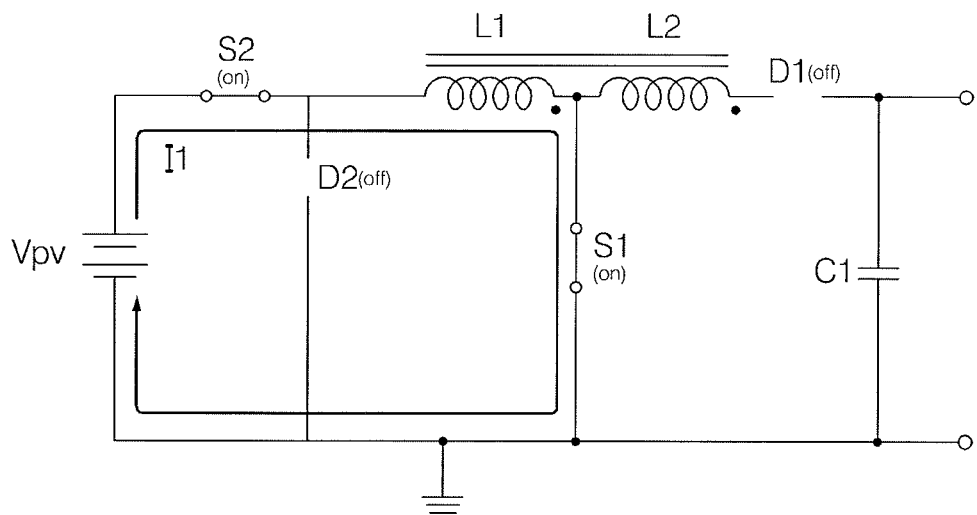
FIGS. 20A to 20D are views referred to for description of the operations of a switching unit and a converter in the power converting apparatus of FIG. 17.
Figure 20B:
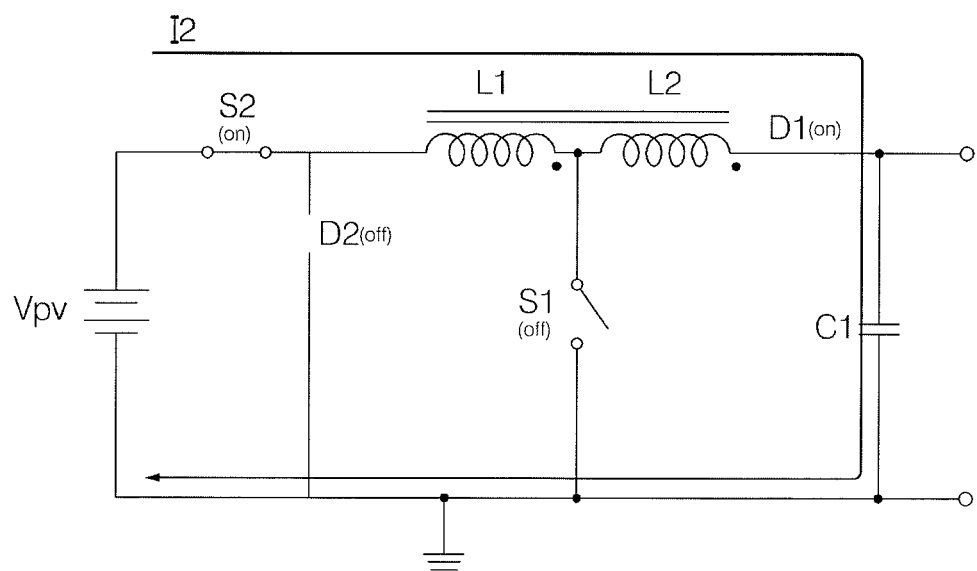
Figure 20C:
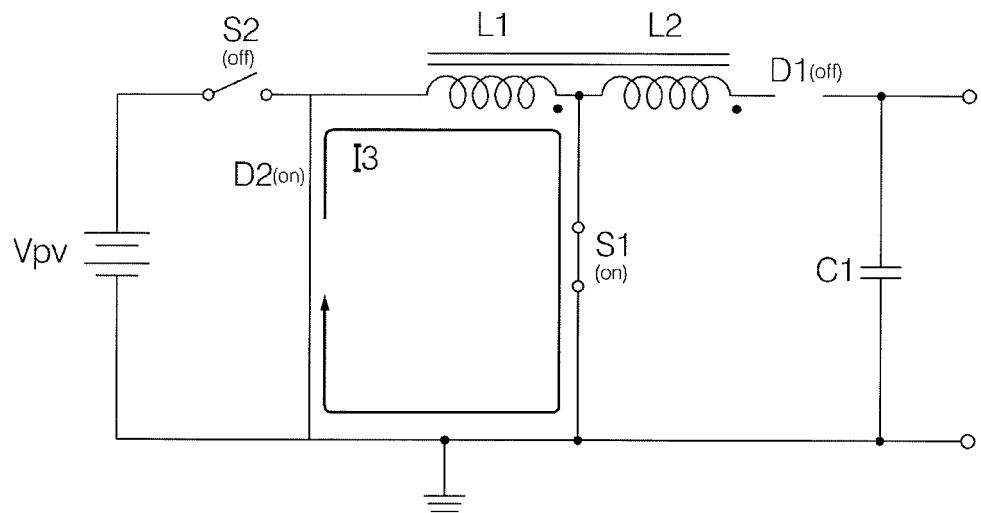
Figure 20D:
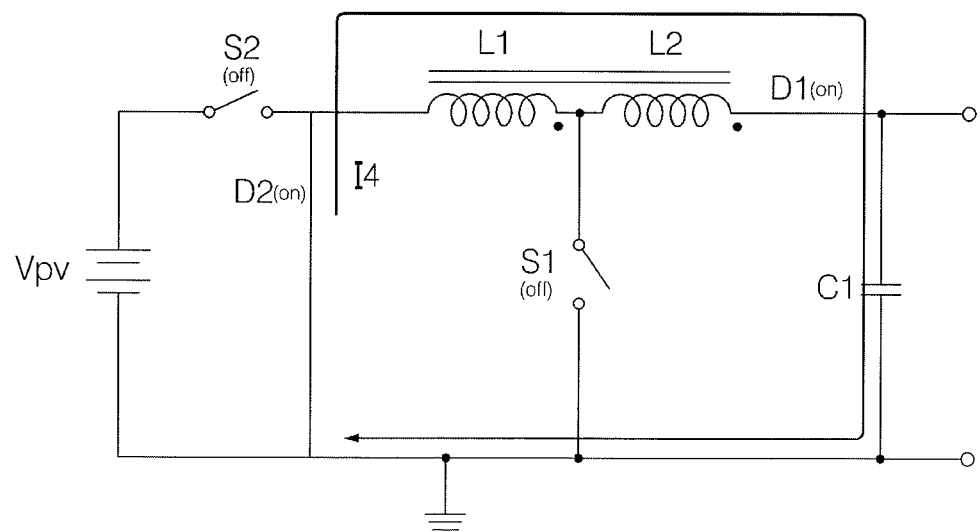

FIGS. 20A and 20B illustrate operations in the instance where the second switch S2 in the switching unit 570 is turned on, and FIGS. 20C and 20D illustrate operations in the instance where the second switch S2 in the switching unit 570 is turned off. When the second switch S2 is turned on, the second diode D2 is turned off. Conversely, when the second switch S2 is turned off, the second diode D2 performs one-way conduction.

When the first switch S1 in the converter 530 is turned on under the condition that the second switch S2 in the switching unit 570 is turned on, a closed loop is formed through the input voltage Vpv, the second switch S2, the primary side of the tapped inductor T and the first switch S1 and first current I1 flows along the closed loop, as shown in FIG. 20A. At this time, the diode D1 does not conduct, namely, it is turned off, because the secondary side of the tapped inductor T has an opposite polarity to that of the primary side thereof. As a result, energy based on the input voltage Vpv is stored at the primary side of the tapped inductor T.

Next, when the first switch S1 in the converter 530 is turned off under the condition that the second switch S2 in the switching unit 570 is turned on, a closed loop is formed through the input voltage Vpv, the second switch S2, the primary side and secondary side of the tapped inductor T, the diode D1 and the capacitor C1 and second current I2 flows along the closed loop, as shown in FIG. 20B. That is, because the secondary side of the tapped inductor T has an opposite polarity to that of the primary side thereof, the diode D1 conducts. As a result, energy stored at the primary side and secondary side of the tapped inductor T is stored in the capacitor C1 via the diode D1.

In this manner, the converter 530 can output a DC voltage of high efficiency and high level using the input voltage Vpv and the energy stored at the primary side and secondary side of the tapped inductor T. That is, when the second switch S2 in the switching unit 570 is turned on as shown in FIGS. 20A and 20B, the converter 530 may operate in the boost mode.

Next, when the first switch S1 in the converter 530 is turned on under the condition that the second switch S2 in the switching unit 570 is turned off, the second diode D2 in the switching unit 570 performs one-way conduction due to energy stored at the primary side of the tapped inductor T, as shown in FIG. 20C. As a result, a closed loop is formed through the second diode D2, the primary side of the tapped inductor T and the first switch S1, and third current I3 flows along the closed loop. At this time, the diode D1 does not conduct, namely, it is turned off, because the secondary side of the tapped inductor T has an opposite polarity to that of the primary side thereof. As a result, the energy stored at the primary side of the tapped inductor T is consumed through the closed loop.

Next, when the first switch S1 in the converter 530 is turned off under the condition that the second switch S2 in the switching unit 570 is turned off, the second diode D2 in the switching unit 570 performs one-way conduction, as shown in FIG. 20D. As a result, a closed loop is formed through the second diode D2, the second switch S2, the primary side and secondary side of the tapped inductor T, the diode D1 and the capacitor C1, and fourth current I4 flows along the closed loop. That is, because the secondary side of the tapped inductor T has an opposite polarity to that of the primary side thereof, the diode D1 conducts. As a result, energy stored at the primary side and secondary side of the tapped inductor T is stored in the capacitor C1 via the diode D1.

At this time, the energy stored at the secondary side of the tapped inductor T is also reduced, because the energy stored at the primary side of the tapped inductor T was reduced as stated above with reference to FIG. 20C. As a result, a level-downed voltage is stored in the capacitor C1. That is, when the second switch S2 in the switching unit 570 is turned off as shown in FIGS. 20C and 20D, the converter 530 may operate in the buck mode.

In the embodiment of the invention, the converter 530 operates in the buck mode with respect to the constant-voltage period of the DC voltage output therefrom, and in the boost mode with respect to the other period of the DC voltage.

Figure 21:
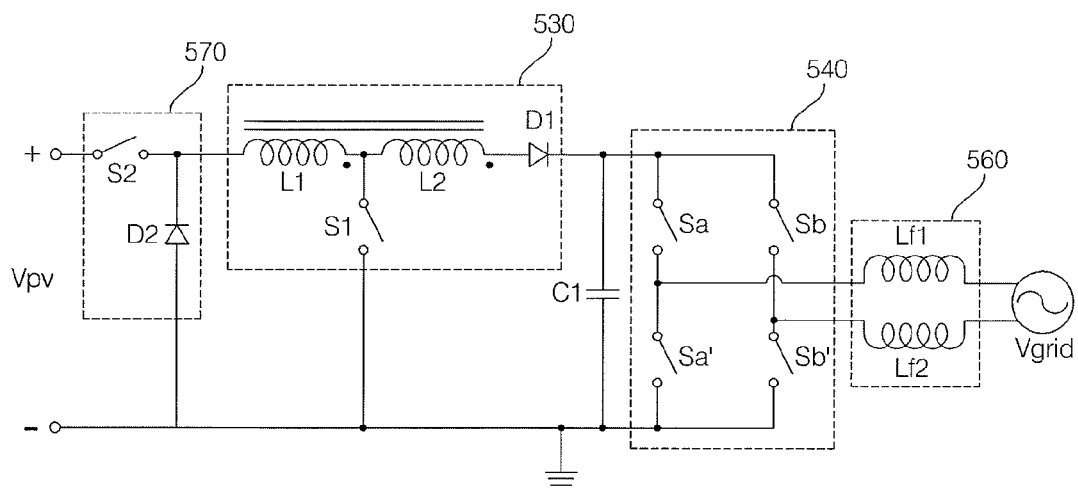
FIGS. 21 to 23 are views referred to for description of the operation of the power converting apparatus of FIG. 17.
Figure 22:
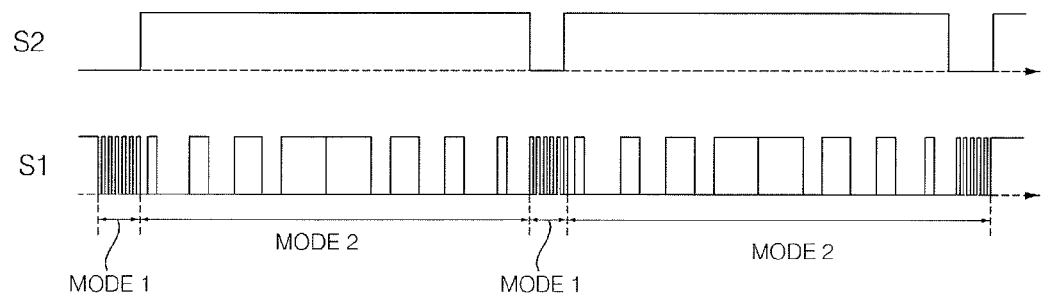
Figure 23:
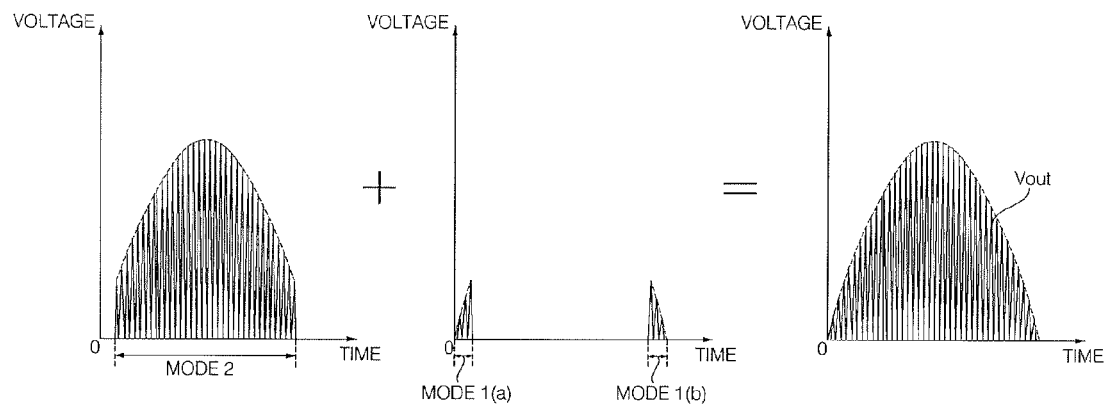

FIG. 21 is a schematic circuit diagram of the power converting apparatus of FIG. 17, FIG. 22 is a waveform diagram of the switches in the converter 530 and inverter 540, and FIG. 23 is a waveform diagram of an AC voltage finally output through the first power conversion mode and the second power conversion mode.

When the constant-voltage period corresponding to the input voltage Vpv is generated in the pseudo DC voltage output from the converter 530, the controller 550 may control the second switch S2 in the switching unit 570 such that the second switch S2 is turned off in the first power conversion mode MODE 1.

Also, the controller 550 may control the first switch S1 in the converter 530 such that the first switch S1 performs a high-speed switching operation in a period of the first power conversion mode MODE 1, as shown in FIG. 22. For example, the first switch S1 may perform the high-speed switching operation at a frequency of 100 kHz.

Accordingly, the converter 530 operates in the buck mode. As a result, the DC voltage falls to a ground voltage of 0V in the constant-voltage period, as shown in FIG. 19A. Therefore, the quality of the output current from the inverter 540 can be improved. Also, a harmonic current component can be significantly reduced.

Alternatively, the controller 550 may control the first switch S1 in the converter 530 such that the first switch S1 performs a low-speed switching operation in the period of the first power conversion mode MODE 1, differently from FIG. 22. In particular, the first switch S1 may perform a PWM-based switching operation such that the converter 530 outputs the pseudo DC voltage.

On the other hand, in the other period of the DC voltage output from the converter 530 other than the constant-voltage period, the controller 550 may control the second switch S2 in the switching unit 570 such that the second switch S2 is turned on in the second power conversion mode MODE 2.

Also, the controller 550 may control the first switch S1 in the converter 530 such that the first switch S1 performs a low-speed switching operation in a period of the second power conversion mode MODE 2. In particular, the first switch S1 may perform a PWM-based switching operation such that the converter 530 outputs the pseudo DC voltage.

Accordingly, the converter 530 operates in the boost mode. As a result, the converter 530 outputs a voltage waveform corresponding to the pseudo DC voltage in the period other than the constant-voltage period, as shown in FIG. 19A.

Finally, an output voltage Vout as shown in FIG. 19A may be provided from the power converting apparatus 1700 by synthesis of output voltage waveforms in the first power conversion modes MODE 1(a) and MODE 1(b) and an output voltage waveform in the second power conversion mode MODE 2, as shown in FIG. 23.

On the other hand, the output AC voltage waveform as shown in FIG. 19A or 23 is low-pass filtered by the filter 560 in FIG. 21, so as to be output as a smoothed AC voltage waveform.

On the other hand, each of the switches Sa, S'a, Sb and S'b in the inverter 540 may perform a switching operation at a fixed switching frequency irrespective of the first power conversion mode MODE 1 and the second power conversion mode MODE 2. For example, each of the switches Sa, S'a, Sb and S'b may perform the switching operation at a low frequency of 100 Hz or 120 Hz.

Figure 24:
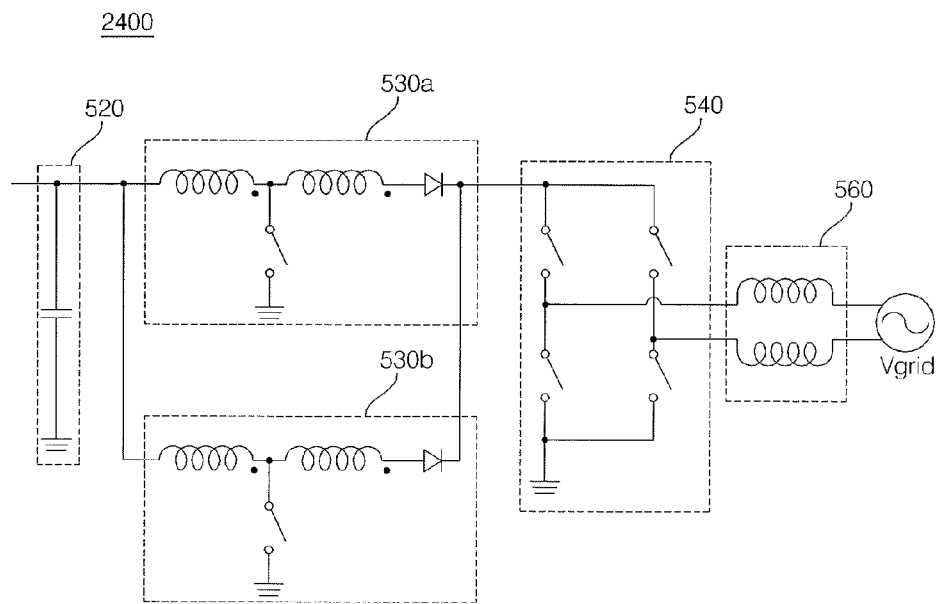
FIG. 24 is a circuit diagram showing another example of the internal configuration of the power converting apparatus according to the another embodiment of the invention.

On the other hand, the configuration of FIG. 24 is substantially the same as that of FIG. 17, with the exception that two tapped inductor boost converters 530a and 530b are used.

That is, the power converting apparatus of FIG. 24, denoted by reference numeral 2400, may include the capacitor unit 520, the two tapped inductor boost converters 530a and 530b, the inverter 540, the filter 560, and the switching unit 570.

In the instance where the two tapped inductor boost converters 530a and 530b are connected in parallel, namely, they are interleaved, as shown in FIG. 24, a current component delivered through the capacitor unit 520 and switching unit 570 is branched in parallel, so that a ripple of a current component output through each of the converters 530a and 530b is reduced. Therefore, it is possible to secure reliability of the capacitors in the capacitor unit 520.

Figure 25:
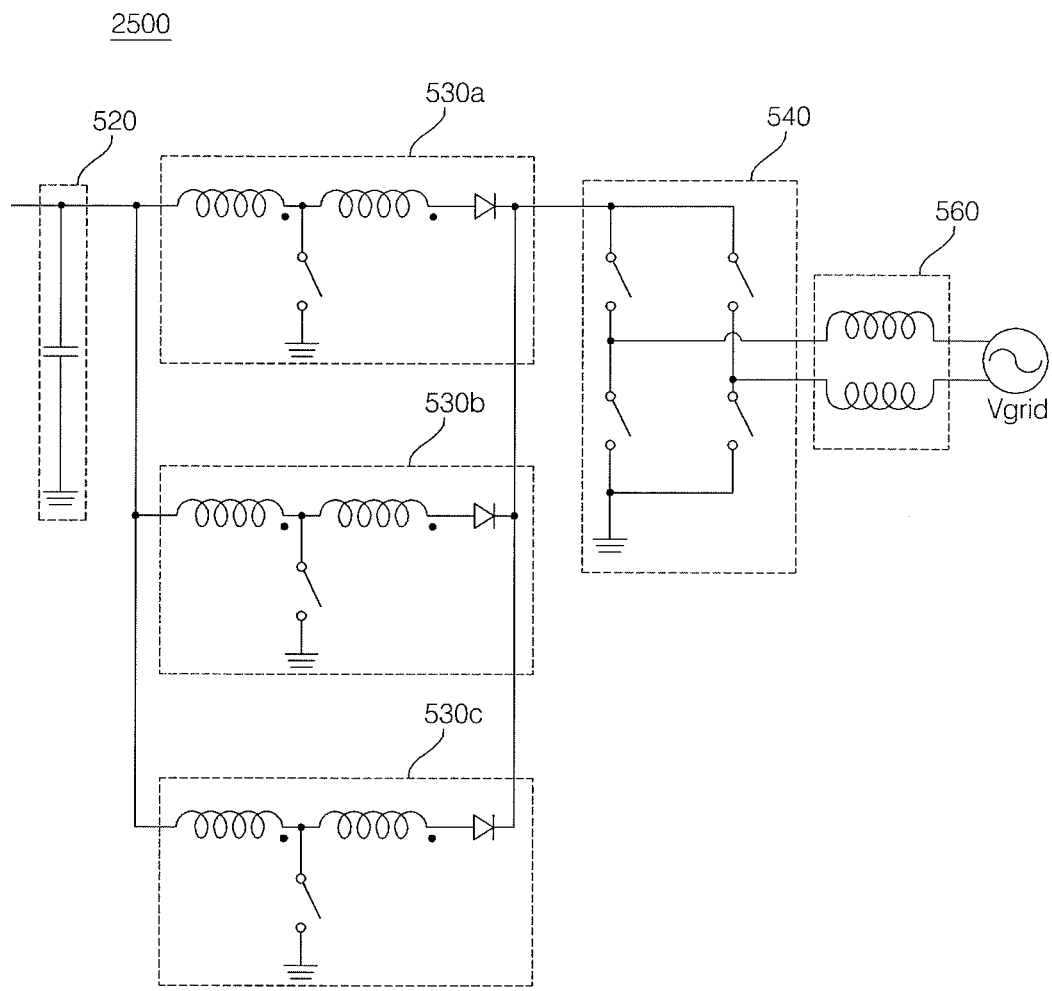
FIG. 25 is a circuit diagram showing another example of the internal configuration of the power converting apparatus according to the another embodiment of the invention.

On the other hand, the configuration of FIG. 25 is substantially the same as that of FIG. 17, with the exception that three tapped inductor boost converters 530a, 530b and 530c are used.

That is, the power converting apparatus of FIG. 25, denoted by reference numeral 2500, may include the capacitor unit 520, the three tapped inductor boost converters 530a, 530b and 530c, the inverter 540, the filter 560, and the switching unit 570.

Here, tapped inductors in the respective converters 530a, 530b and 530c may have the same characteristics and switches in the respective converters 530a, 530b and 530c may also have the same characteristics.

In the instance where the three tapped inductor boost converters 530a, 530b and 530c are connected in parallel, namely, they are interleaved, as shown in FIG. 25, a current component delivered through the capacitor unit 520 and switching unit 570 is branched in parallel, so that a ripple of a current component output through each of the converters 530a, 530b and 530c is reduced. Therefore, it is possible to secure reliability of the capacitors in the capacitor unit 520.

On the other hand, the converters 530a, 530b and 530c may operate adaptively to a power requirement for an output AC voltage.

For example, only the first converter 530a may operate when the power requirement is about 100 W, only the first and second converters 530a and 530b may operate when the power requirement is about 200 W, and all the first to third converters 530a, 530b and 530c may operate when the power requirement is about 300 W.

On the other hand, when at least two of the first to third converters 530a, 530b and 530c operate, the switches therein may have the same turn-on/off timing.

Figure 26:
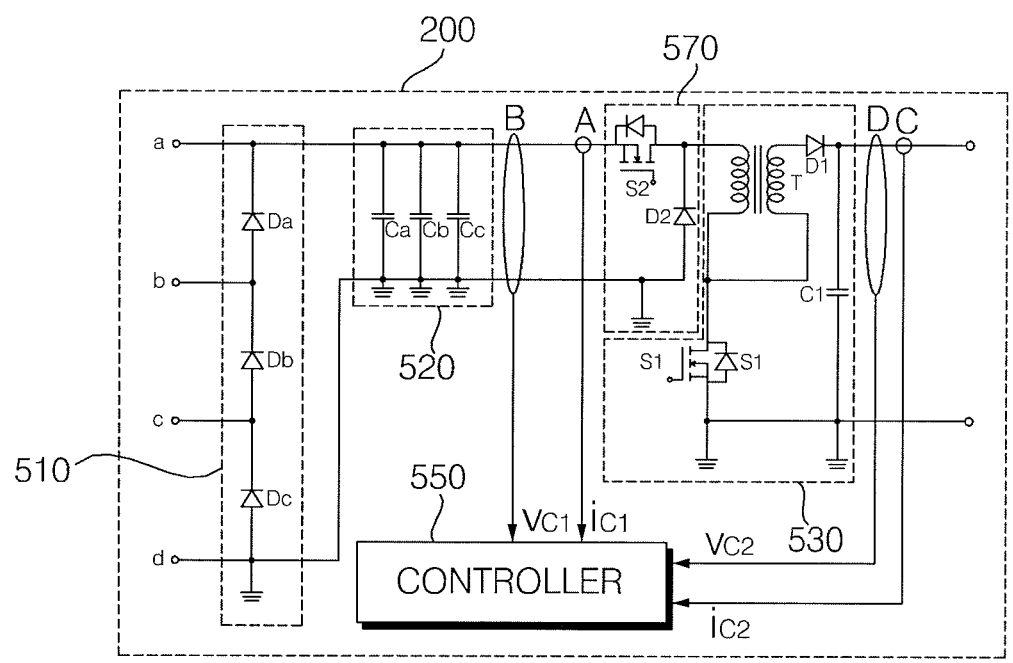
FIG. 26 is a circuit diagram showing another example of the internal configuration of the junction box in the photovoltaic module of FIG. 1.

FIG. 26 is a circuit diagram showing another example of the internal configuration of the junction box 200 in the photovoltaic module 50 of FIG. 1.

Referring to FIG. 26, the junction box 200 according to the embodiment of the invention may include the bypass diode unit 510, the capacitor unit 520, the converter 530, the controller 550, and the switching unit 570. That is, the junction box 200 according to the embodiment of the invention is characterized in that it does not include the inverter 540 and filter 560 in the power converting apparatus 1700 of FIG. 17. The inverter 540 and filter 560, not included in the junction box 200, may be provided separately.

With this configuration, the junction box 200 of FIG. 26 may output a DC voltage. Provided that the junction box 200 performs a power optimizing function, it may be referred to as a power optimizer.

By including, in the junction box, the capacitor unit which stores a DC voltage and the converter which converts the level of the stored DC voltage and outputs the level-converted DC voltage, as shown in FIG. 26, it is possible to supply a DC voltage simply through the junction box. Also, this junction box facilitates installation of the photovoltaic module, and is advantageous to capacity extension in configuring a photovoltaic system including a plurality of photovoltaic modules.

On the other hand, the junction box 200 may include only the bypass diode unit 510 and capacitor unit 520 differently from FIGS. 17 and 26. In this instance, the converter 530, the inverter 540 and the filter 560 may be disposed separately outside of the junction box 200.

Figure 27:
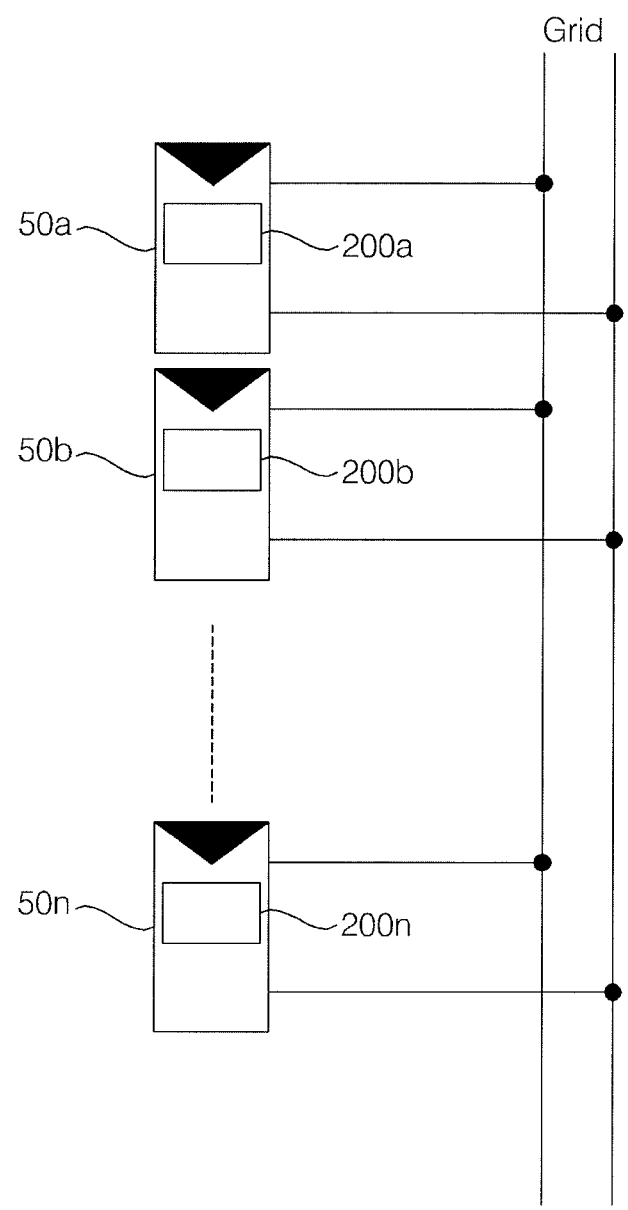
FIG. 27 is a block diagram showing an example of the configuration of a photovoltaic system according to an example embodiment of the invention.

FIG. 27 is a block diagram showing an example of the configuration of a photovoltaic system according to an example embodiment of the invention.

Referring to FIG. 27, the photovoltaic system includes a plurality of photovoltaic modules 50a, 50b, . . . , 50n. The photovoltaic modules 50a, 50b, . . . , 50n may include junction boxes 200a, 200b, . . . , 200n, each of which outputs an AC voltage, respectively. In this instance, each of the junction boxes 200a, 200b, . . . , 200n may be equipped with a micro inverter. The AC voltage output from each of the junction boxes 200a, 200b, . . . , 200n is supplied to a grid.

On the other hand, the power converting apparatus 700 of FIG. 7 according to the one embodiment of the invention or the power converting apparatus 1700 of FIG. 17 according to the another embodiment of the invention may be installed in the junction box 200, and the internal circuit of the junction box 200 may be applied to the micro inverter of FIG. 27.

That is, each of the junction boxes 200a, 200b, . . . , 200n may include the bypass diode unit 510, the capacitor unit 520, the converter 530, the inverter 540, the controller 550, and the filter 560, as in FIG. 7. In particular, the converter 530 may be a tapped inductor boost converter which includes a tapped inductor and a switch, as in FIG. 7.

Alternatively, each of the junction boxes 200a, 200b, . . . , 200n may include the bypass diode unit 510, the capacitor unit 520, the converter 530, the inverter 540, the controller 550, the filter 560, and the switching unit 570, as in FIG. 17. In particular, the converter 530 may be a tapped inductor boost converter which includes a tapped inductor and a switch, as in FIG. 17.

Figure 28:
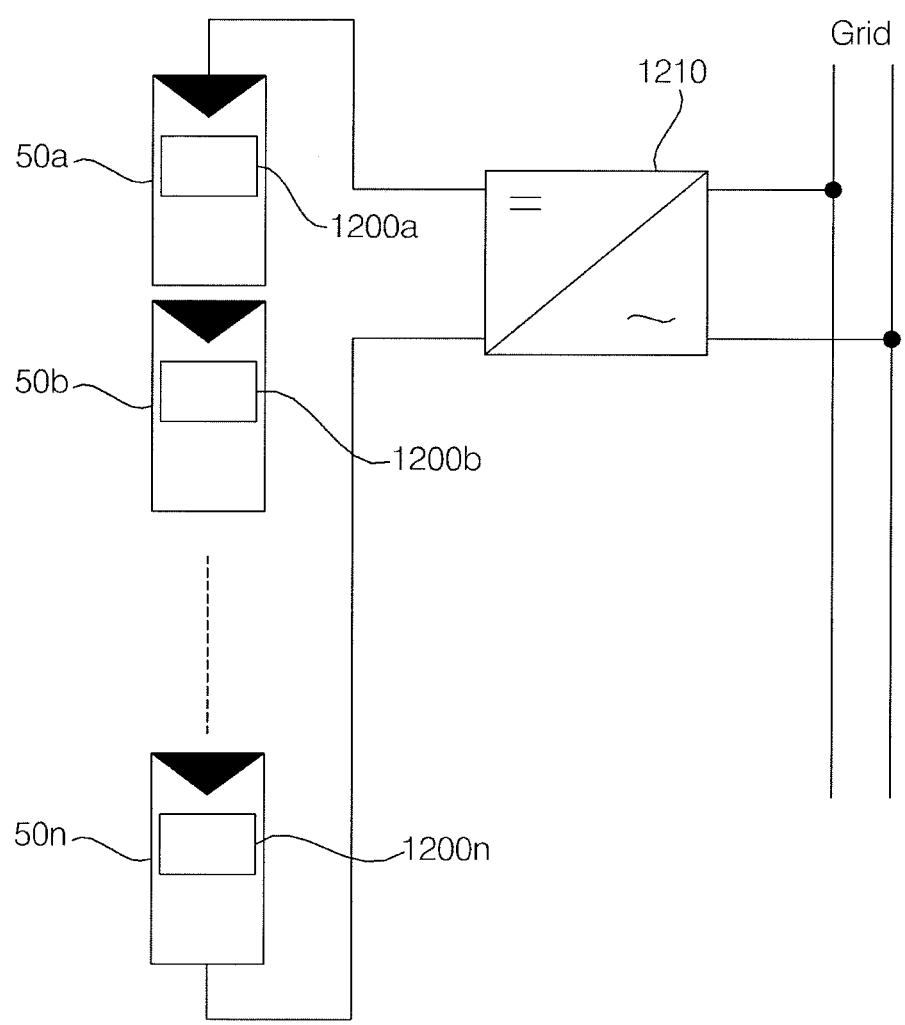
FIG. 28 is a block diagram showing another example of the configuration of the photovoltaic system according to the example embodiment of the invention.

FIG. 28 is a block diagram showing another example of the configuration of the photovoltaic system according to the example embodiment of the invention.

Referring to FIG. 28, the photovoltaic system includes a plurality of photovoltaic modules 50a, 50b, . . . , 50n. The photovoltaic modules 50a, 50b, . . . , 50n may include junction boxes 1200a, 1200b, . . . , 1200n, each of which outputs a DC voltage, respectively. The photovoltaic system further includes a separate inverter 1210 for converting a DC voltage output from each of the photovoltaic modules 50a, 50b, . . . , 50n into an AC voltage. In this instance, each of the junction boxes 1200a, 1200b, . . . , 1200n may be equipped with a power optimizer for efficiently outputting a DC voltage.

On the other hand, the internal circuit of the junction box 200 of FIG. 16 or the internal circuit of the junction box 200 of FIG. 26 may be applied to the power optimizer of FIG. 28.

That is, each of the junction boxes 1200a, 1200b, . . . , 1200n may include the bypass diode unit 510, the capacitor unit 520, the converter 530, and the controller 550, as in FIG. 16. In particular, the converter 530 may be a tapped inductor boost converter which includes a tapped inductor and a switch, as in FIG. 7.

Alternatively, each of the junction boxes 1200a, 1200b, . . . , 1200n may include the bypass diode unit 510, the capacitor unit 520, the converter 530, the controller 550, and the switching unit 570, as in FIG. 26. In particular, the converter 530 may be a tapped inductor boost converter which includes a tapped inductor and a switch, as in FIG. 17.

Figure 29A:
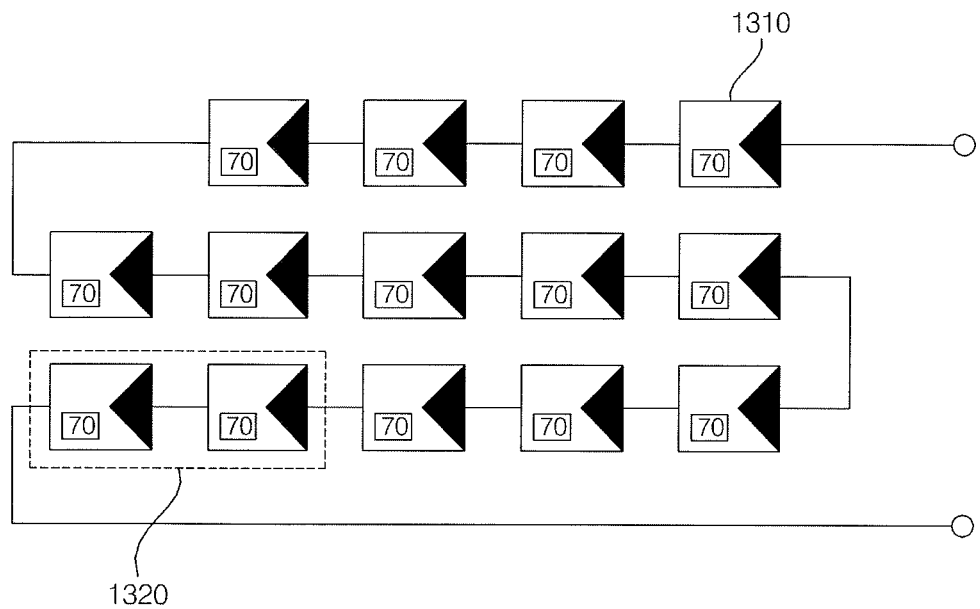
FIGS. 29A and 29B are views referred to for description of power optimizing of the photovoltaic system according to the example embodiment of the invention.
Figure 29B:
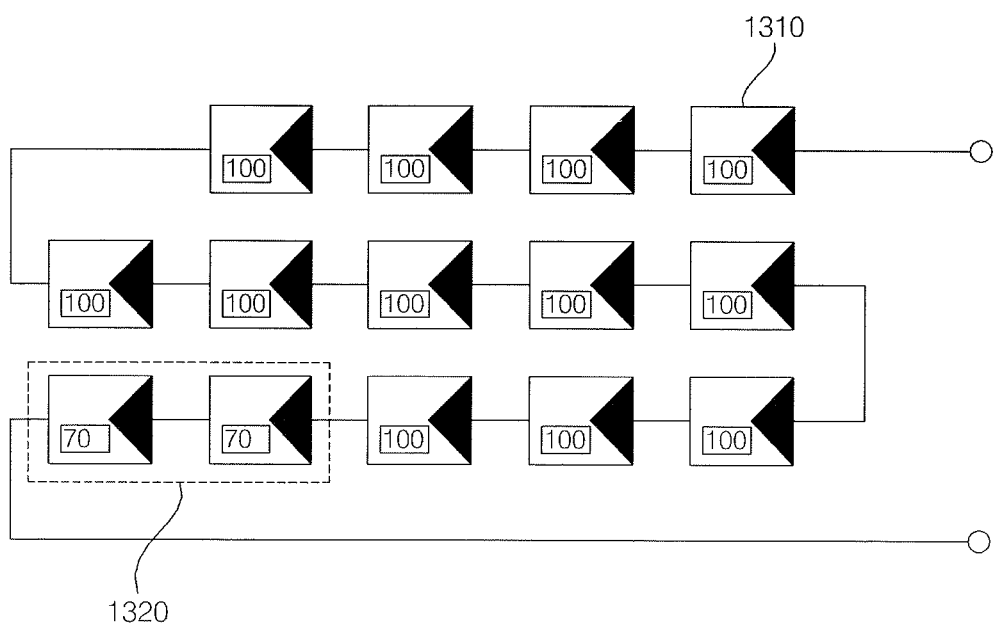

FIGS. 29A and 29B are views referred to for description of power optimizing of the photovoltaic system according to the example embodiment of the invention.

First, with reference to FIG. 29A, a description will be given of an operation in the instance where the power optimizing is not applied. When a hot spot occurs at some solar cell modules 1320 among a plurality of solar cell modules under the condition that the plurality of solar cell modules are connected in series as shown in FIG. 29A, some power loss occurs in the solar cell modules 1320 (for example, power of 70 W is supplied from each of the solar cell modules 1320). In this instance, some power loss also occurs in normal solar cell modules 1310 among the plurality of solar cell modules (for example, power of 70 W is supplied from each of the solar cell modules 1310). As a result, only power of a total of 980 W is supplied.

Next, with reference to FIG. 29B, a description will be given of an operation in the instance where the power optimizing is applied. When a hot spot occurs at some solar cell modules 1320 among a plurality of solar cell modules, some power loss occurs in the solar cell modules 1320 (for example, power of 70 W is supplied from each of the solar cell modules 1320). In this instance, a voltage output from each of the solar cell modules 1320 is downed such that current supplied therefrom is the same as current supplied from each of the other solar cell modules, or normal solar cell modules, 1310. As a result, although some power loss occurs in the solar cell modules 1320 with the hot spot (for example, power of 70 W is supplied from each of the solar cell modules 1320), there is no power loss in the normal solar cell modules 1310 (for example, power of 100 W is supplied from each of the solar cell modules 1310). Therefore, power of a total of 1340 W can be supplied.

In this manner, according to the power optimizing, a voltage supplied from a solar cell module with a hot spot can be adjusted to a voltage based on current supplied from another solar cell module. To this end, the solar cell module with the hot spot receives the value of current or voltage supplied from the another solar cell module and controls a voltage output, etc., therein based on the received current or voltage value.

On the other hand, the junction box 200 of FIG. 16 or the junction box 200 of FIG. 26 may be applied to the power optimizer of FIG. 29B.

The power converting apparatus or photovoltaic module according to the invention is not limited to the configurations and methods of the above-described embodiments of the invention, and all or some of these embodiments of the invention may be selectively combined and configured so that those embodiments of the invention may be subjected to various modifications.

As is apparent from the above description, according to an embodiment of the invention, an inverter in a power converting apparatus or photovoltaic module operates separately in a first switching mode where the inverter performs a switching operation at a first frequency and a second switching mode where the inverter performs a switching operation at a second frequency which is lower than the first frequency, thereby improving quality of the output current.

In particular, when a constant-voltage period is generated in a pseudo DC voltage output from a converter, the DC voltage falls to a ground voltage so that a desired output AC voltage waveform can be obtained. Therefore, the quality of the output current can be improved. Particularly, the influence of a harmonic current component can be reduced.

A ripple of a current component output from the converter is reduced. Therefore, it is possible to secure reliability of capacitors disposed upstream of the converter.

On the other hand, the power converting apparatus or photovoltaic module includes a tapped inductor boost converter, thereby securing a DC voltage of high efficiency and high level.

Alternatively, the power converting apparatus or photovoltaic module may include a plurality of tapped inductor boost converters connected in parallel. As a result, a ripple of a current component output from each of the converters is reduced. Therefore, it is possible to secure reliability of capacitors disposed upstream of the converters.

On the other hand, the power converting apparatus or photovoltaic module may include a plurality of tapped inductor boost converters connected in parallel, which may operate adaptively to a power requirement, thereby improving power efficiency.

According to another embodiment of the invention, a switch of a switching unit in a power converting apparatus or photovoltaic module is turned on or off such that a converter connected to the switching unit operates separately in a boost mode or buck mode, thereby improving quality of the output current.

In particular, when a constant-voltage period is generated in a pseudo DC voltage output from the converter, the DC voltage falls to a ground voltage so that a desired output AC voltage waveform can be obtained. Therefore, the quality of the output current can be improved. Particularly, the influence of a harmonic current component can be reduced.

A ripple of a current component output from the converter is reduced. Therefore, it is possible to secure reliability of capacitors disposed upstream of the converter.

Although the example embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A power converting apparatus comprising:
a converter including a tapped inductor and a first switch, the converter configured to convert a level of an input direct current (DC) voltage and output the level-converted DC voltage; and
an inverter including a plurality of switches, the inverter configured to convert the level-converted DC voltage into an alternating current (AC) voltage,
wherein the inverter operates separately in a first switching mode where the inverter performs a switching operation at a first frequency during a first period of the converted AC voltage and a second switching mode where the inverter performs a switching operation at a second frequency during a second period of the converted AC voltage, the second frequency being lower than the first frequency,
wherein the first period corresponds to a constant-voltage period of the input DC voltage converted by the converter, and
wherein the first switch of the converter performs a switching operation at a switching frequency higher than the first frequency in the first period of the first switching mode of the inverter.

2. The power converting apparatus according to claim 1, wherein the converter converts the level of the input DC voltage to output a level-converted pseudo DC voltage as the level converted DC voltage.

3. The power converting apparatus according to claim 1, further comprising a filter configured to low pass filter the AC voltage output from the inverter.

4. The power converting apparatus according to claim 1, wherein the converter comprises a plurality of converters connected in parallel, each of the plurality of converters comprising a tapped inductor and a switch.

5. The power converting apparatus according to claim 4, wherein at least a part of the plurality of converters operates corresponding to a power requirement for the converted AC voltage.

6. The power converting apparatus according to claim 1, further comprising a controller configured to control switching operations of the first switch of the converter and the plurality of switches of the inverter.

7. The power converting apparatus according to claim 1, wherein the inverter outputs an AC voltage waveform falling to a ground voltage in the first period of the first switching mode.

8. A photovoltaic module comprising:
a solar cell module including a plurality of solar cells; and
a power converting unit configured to convert direct current (DC) power supplied from the solar cell module into alternating current (AC) power,
wherein the power converting unit includes:
a converter including a tapped inductor and a first switch, the converter configured to convert a level of an input DC voltage and output the level-converted DC voltage; and an inverter including a plurality of switches, the inverter configured to convert the level-converted DC voltage into an AC voltage, wherein the inverter operates separately in a first switching mode where the inverter performs a switching operation at a first frequency during a first period of the converted AC voltage and a second switching mode where the inverter performs a switching operation at a second frequency during a second period of the converted AC voltage, the second frequency being lower than the first frequency, wherein the first period corresponds to a constant-voltage period of the input DC voltage converted by the converter, and wherein the first switch of the converter performs a switching operation at a switching frequency higher than the first frequency in the first period of the first switching mode of the inverter.

9. The photovoltaic module according to claim 8, wherein the power converting unit further comprises a bypass diode to bypass a solar cell in which a backward voltage is generated, among the plurality of solar cells.

10. The photovoltaic module according to claim 8, wherein the converter and the inverter in the power converting unit are installed in a junction box, and
wherein the junction box is attached to the solar cell module integrally therewith.

11. The photovoltaic module according to claim 8, wherein the converter in the power converting unit is installed in a junction box, and
wherein the junction box is attached to the solar cell module integrally therewith.

12. The photovoltaic module according to claim 8, wherein the inverter outputs an AC voltage waveform falling to a ground voltage in the first period of the first switching mode.

13. A power converting apparatus comprising:
a switching unit including a switch, the switching unit configured to switch an input direct current (DC) voltage to selectively output the DC voltage;
a converter including a tapped inductor and a switch, the converter configured to convert a level of the DC voltage from the switching unit and output the level-converted DC voltage; and
an inverter including a plurality of switches, the inverter configured to convert the level-converted DC voltage into an alternating current (AC) voltage,
wherein the converter operates in a first power conversion mode for a turn-off period of the switch of the switching unit and in a second power conversion mode for a turn-on period of the switch of the switching unit,
wherein the switch of the converter performs a switching operation at a first frequency in the first power conversion mode and performs a switching operation at a second frequency in the second power conversion mode,
wherein the second frequency is lower than the first frequency, and
wherein a period of the first power conversion mode corresponds to a constant-voltage period of the input DC voltage converted by the converter.

14. The power converting apparatus according to claim 13, wherein the first power conversion mode is a buck mode, and the second power conversion mode is a boost mode.

15. The power converting apparatus according to claim 13, wherein the inverter performs a switching operation at a fixed switching frequency in the first power conversion mode and the second power conversion mode.

16. The power converting apparatus according to claim 13, wherein the converter includes a plurality of converters connected in parallel, each of the plurality of converters including a tapped inductor and a switch.

17. The power converting apparatus according to claim 13, further comprising a controller configured to control switching operations of the switch of the switching unit, the switch of the converter and the plurality of switches of the inverter.

18. A photovoltaic module comprising:
a solar cell module including a plurality of solar cells; and
a power converting unit configured to convert direct current (DC) power supplied from the solar cell module into alternating current (AC) power,
wherein the power converting unit includes:
a switching unit including a switch, the switching unit configured to switch an input DC voltage to selectively output the DC voltage;
a converter including a tapped inductor and a switch, the converter configured to convert a level of the DC voltage from the switching unit and output the level-converted DC voltage; and
an inverter including a plurality of switches, the inverter configured to convert the level-converted DC voltage into an AC voltage,
wherein the converter operates in a first power conversion mode for a turn-off period of the switch of the switching unit and in a second power conversion mode for a turn-on period of the switch of the switching unit,
wherein the switch of the converter performs a switching operation at a first frequency in the first power conversion mode and performs a switching operation at a second frequency in the second power conversion mode,
wherein the second frequency is lower than the first frequency, and
wherein a period of the first power conversion mode corresponds to a constant-voltage period of the input DC voltage converted by the converter.

19. The photovoltaic module according to claim 18, wherein the converter, switching unit and inverter in the power converting unit are installed in a junction box, and
wherein the junction box is attached to the solar cell module integrally therewith.

20. The photovoltaic module according to claim 18, wherein the converter and the switching unit in the power converting unit is installed in a junction box, and
wherein the junction box is attached to the solar cell module integrally therewith.

21. The photovoltaic module according to claim 18, wherein the inverter outputs an AC voltage waveform falling to a ground voltage in the first period of the first switching mode.

* * * * *